(12) United States Patent
Yerramalli et al.

(10) Patent No.: US 12,452,823 B2
(45) Date of Patent: Oct. 21, 2025

(54) MULTI-PORT POSITIONING REFERENCE SIGNAL (PRS) FOR DOWNLINK ANGLE-OF-DEPARTURE (AOD) ESTIMATION

(71) Applicant: QUALCOMM Incorporated, San Diego, CA (US)

(72) Inventors: Srinivas Yerramalli, San Diego, CA (US); Alexandros Manolakos, Escondido, CA (US); Mohammad Tarek Fahim, San Diego, CA (US); Mukesh Kumar, Hyderabad (IN)

(73) Assignee: QUALCOMM INCORPORATED, San Diego, CA (US)

(*) Notice: Subject to any disclaimer, the term of this patent is extended or adjusted under 35 U.S.C. 154(b) by 384 days.

(21) Appl. No.: 18/043,683

(22) PCT Filed: Oct. 4, 2021

(86) PCT No.: PCT/US2021/071694
§ 371 (c)(1),
(2) Date: Mar. 1, 2023

(87) PCT Pub. No.: WO2022/076974
PCT Pub. Date: Apr. 14, 2022

(65) Prior Publication Data
US 2023/0379861 A1    Nov. 23, 2023

(30) Foreign Application Priority Data
Oct. 5, 2020 (IN) .............................. 202041043187

(51) Int. Cl.
*H04W 64/00* (2009.01)
(52) U.S. Cl.
CPC ................................. *H04W 64/00* (2013.01)

(58) Field of Classification Search
None
See application file for complete search history.

(56) References Cited

U.S. PATENT DOCUMENTS

2015/0016291 A1* 1/2015 Kim ..................... H04B 7/0413
                                                        370/252
2021/0282111 A1 9/2021 Yamada et al.
(Continued)

FOREIGN PATENT DOCUMENTS

KR     20200100004 A    8/2020
WO     2019111589 A1    6/2019

OTHER PUBLICATIONS

Castellanos M.R., et al., "Channel Reconstruction-Based Hybrid Preceding for Millimeter Wave Multi-User MIMO Systems", arxiv. org, Cornell University Library, 201 OLIN Library Cornell University Ithaca, NY 14853, Feb. 14, 2018 (Feb. 14, 2018), XP081221980, 15 Pages, DOI: 10.1109/JSTSP.2018.2819135 cited in the application The Whole Document.

(Continued)

*Primary Examiner* — Suhail Khan
(74) *Attorney, Agent, or Firm* — Muncy, Geissler, Olds & Lowe, P.C.

(57) ABSTRACT

Disclosed are techniques for wireless positioning. In an aspect, a user equipment (UE) receives a set of antenna parameters for a plurality of antenna ports of a transmission-reception point (TRP), obtains positioning measurements of a plurality of positioning reference signal (PRS) resources transmitted on the plurality of antenna ports, reconstructs an underlying physical channel between the TRP and the UE based on the positioning measurements of the plurality of PRS resources, and determines a downlink angle of arrival (DL-AoD) measurement from the TRP to the UE based on the reconstructed underlying physical channel.

30 Claims, 12 Drawing Sheets

(56) References Cited

U.S. PATENT DOCUMENTS

2022/0150865 A1 5/2022 Cha et al.
2023/0273284 A1 8/2023 Yerramalli et al.

OTHER PUBLICATIONS

International Search Report and Written Opinion—PCT/US2021/071694—ISA/EPO—Apr. 13, 2022.

* cited by examiner

MULTI-PORT POSITIONING REFERENCE SIGNAL (PRS) FOR DOWNLINK ANGLE-OF-DEPARTURE (AOD) ESTIMATION

CROSS-REFERENCE TO RELATED APPLICATIONS

The present Application for Patent claims priority to Indian Patent Application No. 202041043187, entitled "MULTI-PORT POSITIONING REFERENCE SIGNAL (PRS) FOR DOWNLINK ANGLE-OF-DEPARTURE (AOD) ESTIMATION," filed Oct. 5, 2020, and International Patent Application No. PCT/US2021/071694, entitled "MULTI-PORT POSITIONING REFERENCE SIGNAL (PRS) FOR DOWNLINK ANGLE-OF-DEPARTURE (AOD) ESTIMATION," filed Oct. 4, 2021, both of which are assigned to the assignee hereof and are expressly incorporated herein by reference in their entirety.

BACKGROUND OF THE DISCLOSURE

1. Field of the Disclosure

Aspects of the disclosure relate generally to wireless positioning.

2. Description of the Related Art

Wireless communication systems have developed through various generations, including a first-generation analog wireless phone service (1G), a second-generation (2G) digital wireless phone service (including interim 2.5G and 2.75G networks), a third-generation (3G) high speed data, Internet-capable wireless service and a fourth-generation (4G) service (e.g., Long Term Evolution (LTE) or WiMax). There are presently many different types of wireless communication systems in use, including cellular and personal communications service (PCS) systems. Examples of known cellular systems include the cellular analog advanced mobile phone system (AMPS), and digital cellular systems based on code division multiple access (CDMA), frequency division multiple access (FDMA), time division multiple access (TDMA), the Global System for Mobile communications (GSM), etc.

A fifth generation (5G) wireless standard, referred to as New Radio (NR), enables higher data transfer speeds, greater numbers of connections, and better coverage, among other improvements. The 5G standard, according to the Next Generation Mobile Networks Alliance, is designed to provide higher data rates as compared to previous standards, more accurate positioning (e.g., based on reference signals for positioning (RS-P), such as downlink, uplink, or sidelink positioning reference signals (PRS)), and other technical enhancements. These enhancements, as well as the use of higher frequency bands, advances in PRS processes and technology, and high-density deployments for 5G, enable highly accurate 5G-based positioning.

SUMMARY

The following presents a simplified summary relating to one or more aspects disclosed herein. Thus, the following summary should not be considered an extensive overview relating to all contemplated aspects, nor should the following summary be considered to identify key or critical elements relating to all contemplated aspects or to delineate the scope associated with any particular aspect. Accordingly, the following summary has the sole purpose to present certain concepts relating to one or more aspects relating to the mechanisms disclosed herein in a simplified form to precede the detailed description presented below.

In an aspect, a method of wireless positioning performed by a user equipment (UE) includes receiving a set of antenna parameters for a plurality of antenna ports of a transmission-reception point (TRP); obtaining positioning measurements of a plurality of positioning reference signal (PRS) resources transmitted on the plurality of antenna ports; reconstructing an underlying physical channel between the TRP and the UE based on the positioning measurements of the plurality of PRS resources; and determining a downlink angle of arrival (DL-AoD) measurement from the TRP to the UE based on the reconstructed underlying physical channel.

In an aspect, a user equipment (UE) includes a memory; at least one transceiver; and at least one processor communicatively coupled to the memory and the at least one transceiver, the at least one processor configured to: receive, via the at least one transceiver, a set of antenna parameters for a plurality of antenna ports of a transmission-reception point (TRP); obtain positioning measurements of a plurality of positioning reference signal (PRS) resources transmitted on the plurality of antenna ports; reconstruct an underlying physical channel between the TRP and the UE based on the positioning measurements of the plurality of PRS resources; and determine a downlink angle of arrival (DL-AoD) measurement from the TRP to the UE based on the reconstructed underlying physical channel.

In an aspect, a user equipment (UE) includes means for receiving a set of antenna parameters for a plurality of antenna ports of a transmission-reception point (TRP); means for obtaining positioning measurements of a plurality of positioning reference signal (PRS) resources transmitted on the plurality of antenna ports; means for reconstructing an underlying physical channel between the TRP and the UE based on the positioning measurements of the plurality of PRS resources; and means for determining a downlink angle of arrival (DL-AoD) measurement from the TRP to the UE based on the reconstructed underlying physical channel.

In an aspect, a non-transitory computer-readable medium stores computer-executable instructions that, when executed by a user equipment (UE), cause the UE to: receive a set of antenna parameters for a plurality of antenna ports of a transmission-reception point (TRP); obtain positioning measurements of a plurality of positioning reference signal (PRS) resources transmitted on the plurality of antenna ports; reconstruct an underlying physical channel between the TRP and the UE based on the positioning measurements of the plurality of PRS resources; and determine a downlink angle of arrival (DL-AoD) measurement from the TRP to the UE based on the reconstructed underlying physical channel.

Other objects and advantages associated with the aspects disclosed herein will be apparent to those skilled in the art based on the accompanying drawings and detailed description.

BRIEF DESCRIPTION OF THE DRAWINGS

The accompanying drawings are presented to aid in the description of various aspects of the disclosure and are provided solely for illustration of the aspects and not limitation thereof.

DETAILED DESCRIPTION

Figure 1:
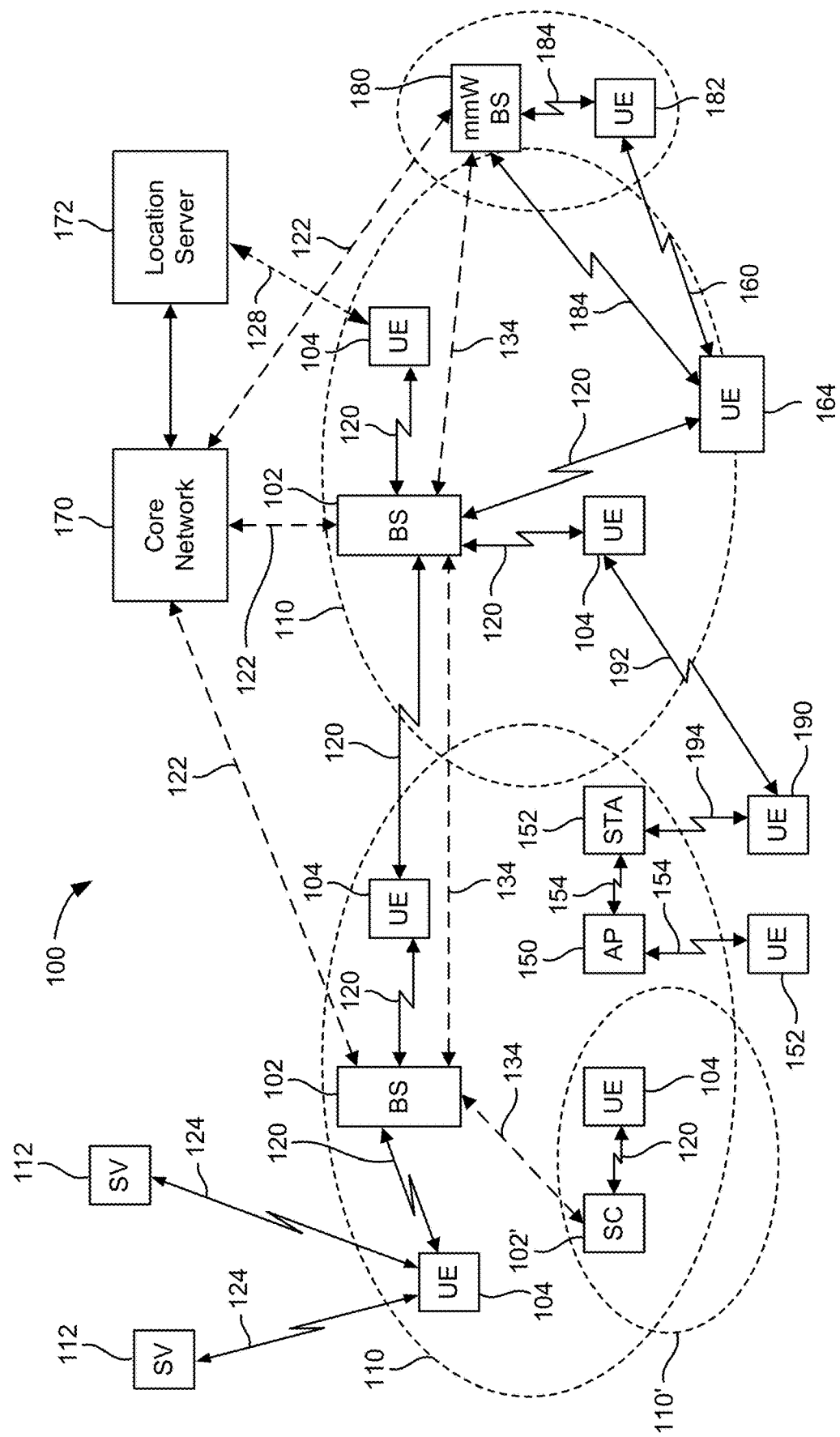
FIG. 1 illustrates an example wireless communications system, according to aspects of the disclosure.

Aspects of the disclosure are provided in the following description and related drawings directed to various examples provided for illustration purposes. Alternate aspects may be devised without departing from the scope of the disclosure. Additionally, well-known elements of the disclosure will not be described in detail or will be omitted so as not to obscure the relevant details of the disclosure.

The words "exemplary" and/or "example" are used herein to mean "serving as an example, instance, or illustration." Any aspect described herein as "exemplary" and/or "example" is not necessarily to be construed as preferred or advantageous over other aspects. Likewise, the term "aspects of the disclosure" does not require that all aspects of the disclosure include the discussed feature, advantage or mode of operation.

Those of skill in the art will appreciate that the information and signals described below may be represented using any of a variety of different technologies and techniques. For example, data, instructions, commands, information, signals, bits, symbols, and chips that may be referenced throughout the description below may be represented by voltages, currents, electromagnetic waves, magnetic fields or particles, optical fields or particles, or any combination thereof, depending in part on the particular application, in part on the desired design, in part on the corresponding technology, etc.

Further, many aspects are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, the sequence(s) of actions described herein can be considered to be embodied entirely within any form of non-transitory computer-readable storage medium having stored therein a corresponding set of computer instructions that, upon execution, would cause or instruct an associated processor of a device to perform the functionality described herein. Thus, the various aspects of the disclosure may be embodied in a number of different forms, all of which have been contemplated to be within the scope of the claimed subject matter. In addition, for each of the aspects described herein, the corresponding form of any such aspects may be described herein as, for example, "logic configured to" perform the described action.

As used herein, the terms "user equipment" (UE) and "base station" are not intended to be specific or otherwise limited to any particular radio access technology (RAT), unless otherwise noted. In general, a UE may be any wireless communication device (e.g., a mobile phone, router, tablet computer, laptop computer, consumer asset locating device, wearable (e.g., smartwatch, glasses, augmented reality (AR)/virtual reality (VR) headset, etc.), vehicle (e.g., automobile, motorcycle, bicycle, etc.), Internet of Things (IoT) device, etc.) used by a user to communicate over a wireless communications network. A UE may be mobile or may (e.g., at certain times) be stationary, and may communicate with a radio access network (RAN). As used herein, the term "UE" may be referred to interchangeably as an "access terminal" or "AT," a "client device," a "wireless device," a "subscriber device," a "subscriber terminal," a "subscriber station," a "user terminal" or "UT," a "mobile device," a "mobile terminal," a "mobile station," or variations thereof. Generally, UEs can communicate with a core network via a RAN, and through the core network the UEs can be connected with external networks such as the Internet and with other UEs. Of course, other mechanisms of connecting to the core network and/or the Internet are also possible for the UEs, such as over wired access networks, wireless local area network (WLAN) networks (e.g., based on the Institute of Electrical and Electronics Engineers (IEEE) 802.11 specification, etc.) and so on.

A base station may operate according to one of several RATs in communication with UEs depending on the network in which it is deployed, and may be alternatively referred to as an access point (AP), a network node, a NodeB, an evolved NodeB (eNB), a next generation eNB (ng-eNB), a New Radio (NR) Node B (also referred to as a gNB or gNodeB), etc. A base station may be used primarily to support wireless access by UEs, including supporting data, voice, and/or signaling connections for the supported UEs. In some systems a base station may provide purely edge node signaling functions while in other systems it may provide additional control and/or network management functions. A communication link through which UEs can send signals to a base station is called an uplink (UL) channel (e.g., a reverse traffic channel, a reverse control channel, an access channel, etc.). A communication link through which the base station can send signals to UEs is called a downlink (DL) or forward link channel (e.g., a paging channel, a control channel, a broadcast channel, a forward traffic channel, etc.). As used herein the term traffic channel (TCH) can refer to either an uplink/reverse or downlink/forward traffic channel.

The term "base station" may refer to a single physical transmission-reception point (TRP) or to multiple physical TRPs that may or may not be co-located. For example, where the term "base station" refers to a single physical TRP, the physical TRP may be an antenna of the base station corresponding to a cell (or several cell sectors) of the base station. Where the term "base station" refers to multiple co-located physical TRPs, the physical TRPs may be an array of antennas (e.g., as in a multiple-input multiple-output (MIMO) system or where the base station employs beamforming) of the base station. Where the term "base station" refers to multiple non-co-located physical TRPs, the physical TRPs may be a distributed antenna system (DAS) (a network of spatially separated antennas connected to a common source via a transport medium) or a remote radio head (RRH) (a remote base station connected to a serving base station). Alternatively, the non-co-located physical TRPs may be the serving base station receiving the measurement report from the UE and a neighbor base station whose reference radio frequency (RF) signals the UE is measuring. Because a TRP is the point from which a base station transmits and receives wireless signals, as used herein, references to transmission from or reception at a base station are to be understood as referring to a particular TRP of the base station.

In some implementations that support positioning of UEs, a base station may not support wireless access by UEs (e.g., may not support data, voice, and/or signaling connections for UEs), but may instead transmit reference signals to UEs to be measured by the UEs, and/or may receive and measure signals transmitted by the UEs. Such a base station may be referred to as a positioning beacon (e.g., when transmitting signals to UEs) and/or as a location measurement unit (e.g., when receiving and measuring signals from UEs).

An "RF signal" comprises an electromagnetic wave of a given frequency that transports information through the space between a transmitter and a receiver. As used herein, a transmitter may transmit a single "RF signal" or multiple "RF signals" to a receiver. However, the receiver may receive multiple "RF signals" corresponding to each transmitted RF signal due to the propagation characteristics of RF signals through multipath channels. The same transmitted RF signal on different paths between the transmitter and receiver may be referred to as a "multipath" RF signal. As used herein, an RF signal may also be referred to as a "wireless signal" or simply a "signal" where it is clear from the context that the term "signal" refers to a wireless signal or an RF signal.

FIG. 1 illustrates an example wireless communications system 100, according to aspects of the disclosure. The wireless communications system 100 (which may also be referred to as a wireless wide area network (WWAN)) may include various base stations 102 (labeled "BS") and various UEs 104. The base stations 102 may include macro cell base stations (high power cellular base stations) and/or small cell base stations (low power cellular base stations). In an aspect, the macro cell base stations may include eNBs and/or ng-eNBs where the wireless communications system 100 corresponds to an LTE network, or gNBs where the wireless communications system 100 corresponds to a NR network, or a combination of both, and the small cell base stations may include femtocells, picocells, microcells, etc.

The base stations 102 may collectively form a RAN and interface with a core network 170 (e.g., an evolved packet core (EPC) or a 5G core (5GC)) through backhaul links 122, and through the core network 170 to one or more location servers 172 (e.g., a location management function (LMF) or a secure user plane location (SUPL) location platform (SLP)). The location server(s) 172 may be part of core network 170 or may be external to core network 170. A location server 172 may be integrated with a base station 102. A UE 104 may communicate with a location server 172 directly or indirectly. For example, a UE 104 may communicate with a location server 172 via the base station 102 that is currently serving that UE 104. A UE 104 may also communicate with a location server 172 through another path, such as via an application server (not shown), via another network, such as via a wireless local area network (WLAN) access point (AP) (e.g., AP 150 described below), and so on. For signaling purposes, communication between a UE 104 and a location server 172 may be represented as an indirect connection (e.g., through the core network 170, etc.) or a direct connection (e.g., as shown via direct connection 128), with the intervening nodes (if any) omitted from a signaling diagram for clarity.

In addition to other functions, the base stations 102 may perform functions that relate to one or more of transferring user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, RAN sharing, multimedia broadcast multicast service (MBMS), subscriber and equipment trace, RAN information management (RIM), paging, positioning, and delivery of warning messages. The base stations 102 may communicate with each other directly or indirectly (e.g., through the EPC/5GC) over backhaul links 134, which may be wired or wireless.

The base stations 102 may wirelessly communicate with the UEs 104. Each of the base stations 102 may provide communication coverage for a respective geographic coverage area 110. In an aspect, one or more cells may be supported by a base station 102 in each geographic coverage area 110. A "cell" is a logical communication entity used for communication with a base station (e.g., over some frequency resource, referred to as a carrier frequency, component carrier, carrier, band, or the like), and may be associated with an identifier (e.g., a physical cell identifier (PCI), an enhanced cell identifier (ECI), a virtual cell identifier (VCI), a cell global identifier (CGI), etc.) for distinguishing cells operating via the same or a different carrier frequency. In some cases, different cells may be configured according to different protocol types (e.g., machine-type communication (MTC), narrowband IoT (NB-IoT), enhanced mobile broadband (eMBB), or others) that may provide access for different types of UEs. Because a cell is supported by a specific base station, the term "cell" may refer to either or both of the logical communication entity and the base station that supports it, depending on the context. In addition, because a TRP is typically the physical transmission point of a cell, the terms "cell" and "TRP" may be used interchangeably. In some cases, the term "cell" may also refer to a geographic coverage area of a base station (e.g., a sector), insofar as a carrier frequency can be detected and used for communication within some portion of geographic coverage areas 110.

While neighboring macro cell base station 102 geographic coverage areas 110 may partially overlap (e.g., in a handover region), some of the geographic coverage areas 110 may be substantially overlapped by a larger geographic coverage area 110. For example, a small cell base station 102' (labeled "SC" for "small cell") may have a geographic coverage area 110' that substantially overlaps with the geographic coverage area 110 of one or more macro cell base stations 102. A network that includes both small cell and macro cell base stations may be known as a heterogeneous network. A heterogeneous network may also include home eNBs (HeNBs), which may provide service to a restricted group known as a closed subscriber group (CSG).

The communication links 120 between the base stations 102 and the UEs 104 may include uplink (also referred to as reverse link) transmissions from a UE 104 to a base station 102 and/or downlink (DL) (also referred to as forward link) transmissions from a base station 102 to a UE 104. The communication links 120 may use MIMO antenna technology, including spatial multiplexing, beamforming, and/or transmit diversity. The communication links 120 may be through one or more carrier frequencies. Allocation of carriers may be asymmetric with respect to downlink and uplink (e.g., more or less carriers may be allocated for downlink than for uplink).

The wireless communications system 100 may further include a wireless local area network (WLAN) access point (AP) 150 in communication with WLAN stations (STAs) 152 via communication links 154 in an unlicensed frequency spectrum (e.g., 5 GHz). When communicating in an unlicensed frequency spectrum, the WLAN STAs 152 and/or the WLAN AP 150 may perform a clear channel assessment (CCA) or listen before talk (LBT) procedure prior to communicating in order to determine whether the channel is available.

The small cell base station 102' may operate in a licensed and/or an unlicensed frequency spectrum. When operating in an unlicensed frequency spectrum, the small cell base station 102' may employ LTE or NR technology and use the same 5 GHz unlicensed frequency spectrum as used by the WLAN AP 150. The small cell base station 102', employing LTE/5G in an unlicensed frequency spectrum, may boost coverage to and/or increase capacity of the access network. NR in unlicensed spectrum may be referred to as NR-U. LTE in an unlicensed spectrum may be referred to as LTE-U, licensed assisted access (LAA), or MulteFire.

The wireless communications system 100 may further include a millimeter wave (mmW) base station 180 that may operate in mmW frequencies and/or near mmW frequencies in communication with a UE 182. Extremely high frequency (EHF) is part of the RF in the electromagnetic spectrum. EHF has a range of 30 GHz to 300 GHz and a wavelength between 1 millimeter and 10 millimeters. Radio waves in this band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band have high path loss and a relatively short range. The mmW base station 180 and the UE 182 may utilize beamforming (transmit and/or receive) over a mmW communication link 184 to compensate for the extremely high path loss and short range. Further, it will be appreciated that in alternative configurations, one or more base stations 102 may also transmit using mmW or near mmW and beamforming. Accordingly, it will be appreciated that the foregoing illustrations are merely examples and should not be construed to limit the various aspects disclosed herein.

Transmit beamforming is a technique for focusing an RF signal in a specific direction. Traditionally, when a network node (e.g., a base station) broadcasts an RF signal, it broadcasts the signal in all directions (omni-directionally). With transmit beamforming, the network node determines where a given target device (e.g., a UE) is located (relative to the transmitting network node) and projects a stronger downlink RF signal in that specific direction, thereby providing a faster (in terms of data rate) and stronger RF signal for the receiving device(s). To change the directionality of the RF signal when transmitting, a network node can control the phase and relative amplitude of the RF signal at each of the one or more transmitters that are broadcasting the RF signal. For example, a network node may use an array of antennas (referred to as a "phased array" or an "antenna array") that creates a beam of RF waves that can be "steered" to point in different directions, without actually moving the antennas. Specifically, the RF current from the transmitter is fed to the individual antennas with the correct phase relationship so that the radio waves from the separate antennas add together to increase the radiation in a desired direction, while cancelling to suppress radiation in undesired directions.

Transmit beams may be quasi-co-located, meaning that they appear to the receiver (e.g., a UE) as having the same parameters, regardless of whether or not the transmitting antennas of the network node themselves are physically co-located. In NR, there are four types of quasi-co-location (QCL) relations. Specifically, a QCL relation of a given type means that certain parameters about a second reference RF signal on a second beam can be derived from information about a source reference RF signal on a source beam. Thus, if the source reference RF signal is QCL Type A, the receiver can use the source reference RF signal to estimate the Doppler shift, Doppler spread, average delay, and delay spread of a second reference RF signal transmitted on the same channel. If the source reference RF signal is QCL Type B, the receiver can use the source reference RF signal to estimate the Doppler shift and Doppler spread of a second reference RF signal transmitted on the same channel. If the source reference RF signal is QCL Type C, the receiver can use the source reference RF signal to estimate the Doppler shift and average delay of a second reference RF signal transmitted on the same channel. If the source reference RF signal is QCL Type D, the receiver can use the source reference RF signal to estimate the spatial receive parameter of a second reference RF signal transmitted on the same channel.

In receive beamforming, the receiver uses a receive beam to amplify RF signals detected on a given channel. For example, the receiver can increase the gain setting and/or adjust the phase setting of an array of antennas in a particular direction to amplify (e.g., to increase the gain level of) the RF signals received from that direction. Thus, when a receiver is said to beamform in a certain direction, it means the beam gain in that direction is high relative to the beam gain along other directions, or the beam gain in that direction is the highest compared to the beam gain in that direction of all other receive beams available to the receiver. This results in a stronger received signal strength (e.g., reference signal received power (RSRP), reference signal received quality (RSRQ), signal-to-interference-plus-noise ratio (SINR), etc.) of the RF signals received from that direction.

Transmit and receive beams may be spatially related. A spatial relation means that parameters for a second beam (e.g., a transmit or receive beam) for a second reference signal can be derived from information about a first beam (e.g., a receive beam or a transmit beam) for a first reference signal. For example, a UE may use a particular receive beam to receive a reference downlink reference signal (e.g., synchronization signal block (SSB)) from a base station. The UE can then form a transmit beam for sending an uplink reference signal (e.g., sounding reference signal (SRS)) to that base station based on the parameters of the receive beam.

Note that a "downlink" beam may be either a transmit beam or a receive beam, depending on the entity forming it. For example, if a base station is forming the downlink beam to transmit a reference signal to a UE, the downlink beam is a transmit beam. If the UE is forming the downlink beam, however, it is a receive beam to receive the downlink reference signal. Similarly, an "uplink" beam may be either a transmit beam or a receive beam, depending on the entity forming it. For example, if a base station is forming the uplink beam, it is an uplink receive beam, and if a UE is forming the uplink beam, it is an uplink transmit beam.

The electromagnetic spectrum is often subdivided, based on frequency/wavelength, into various classes, bands, channels, etc. In 5G NR two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

In a multi-carrier system, such as 5G, one of the carrier frequencies is referred to as the "primary carrier" or "anchor carrier" or "primary serving cell" or "PCell," and the remaining carrier frequencies are referred to as "secondary carriers" or "secondary serving cells" or "SCells." In carrier aggregation, the anchor carrier is the carrier operating on the primary frequency (e.g., FR1) utilized by a UE 104/182 and the cell in which the UE 104/182 either performs the initial radio resource control (RRC) connection establishment procedure or initiates the RRC connection re-establishment procedure. The primary carrier carries all common and UE-specific control channels, and may be a carrier in a licensed frequency (however, this is not always the case). A secondary carrier is a carrier operating on a second frequency (e.g., FR2) that may be configured once the RRC connection is established between the UE 104 and the anchor carrier and that may be used to provide additional radio resources. In some cases, the secondary carrier may be a carrier in an unlicensed frequency. The secondary carrier may contain only necessary signaling information and signals, for example, those that are UE-specific may not be present in the secondary carrier, since both primary uplink and downlink carriers are typically UE-specific. This means that different UEs 104/182 in a cell may have different downlink primary carriers. The same is true for the uplink primary carriers. The network is able to change the primary carrier of any UE 104/182 at any time. This is done, for example, to balance the load on different carriers. Because a "serving cell" (whether a PCell or an SCell) corresponds to a carrier frequency/component carrier over which some base station is communicating, the term "cell," "serving cell," "component carrier," "carrier frequency," and the like can be used interchangeably.

For example, still referring to FIG. 1, one of the frequencies utilized by the macro cell base stations 102 may be an anchor carrier (or "PCell") and other frequencies utilized by the macro cell base stations 102 and/or the mmW base station 180 may be secondary carriers ("SCells"). The simultaneous transmission and/or reception of multiple carriers enables the UE 104/182 to significantly increase its data transmission and/or reception rates. For example, two 20 MHz aggregated carriers in a multi-carrier system would theoretically lead to a two-fold increase in data rate (i.e., 40 MHz), compared to that attained by a single 20 MHz carrier.

The wireless communications system 100 may further include a UE 164 that may communicate with a macro cell base station 102 over a communication link 120 and/or the mmW base station 180 over a mmW communication link 184. For example, the macro cell base station 102 may support a PCell and one or more S Cells for the UE 164 and the mmW base station 180 may support one or more SCells for the UE 164.

In some cases, the UE 164 and the UE 182 may be capable of sidelink communication. Sidelink-capable UEs (SL-UEs) may communicate with base stations 102 over communication links 120 using the Uu interface (i.e., the air interface between a UE and a base station). SL-UEs (e.g., UE 164, UE 182) may also communicate directly with each other over a wireless sidelink 160 using the PC5 interface (i.e., the air interface between sidelink-capable UEs). A wireless sidelink (or just "sidelink") is an adaptation of the core cellular (e.g., LTE, NR) standard that allows direct communication between two or more UEs without the communication needing to go through a base station. Sidelink communication may be unicast or multicast, and may be used for device-to-device (D2D) media-sharing, vehicle-to-vehicle (V2V) communication, vehicle-to-everything (V2X) communication (e.g., cellular V2X (cV2X) communication, enhanced V2X (eV2X) communication, etc.), emergency rescue applications, etc. One or more of a group of SL-UEs utilizing sidelink communications may be within the geographic coverage area 110 of a base station 102. Other SL-UEs in such a group may be outside the geographic coverage area 110 of a base station 102 or be otherwise unable to receive transmissions from a base station 102. In some cases, groups of SL-UEs communicating via sidelink communications may utilize a one-to-many (1:M) system in which each SL-UE transmits to every other SL-UE in the group. In some cases, a base station 102 facilitates the scheduling of resources for sidelink communications. In other cases, sidelink communications are carried out between SL-UEs without the involvement of a base station 102.

In an aspect, the sidelink 160 may operate over a wireless communication medium of interest, which may be shared with other wireless communications between other vehicles and/or infrastructure access points, as well as other RATs. A "medium" may be composed of one or more time, frequency, and/or space communication resources (e.g., encompassing one or more channels across one or more carriers) associated with wireless communication between one or more transmitter/receiver pairs. In an aspect, the medium of interest may correspond to at least a portion of an unlicensed frequency band shared among various RATs. Although different licensed frequency bands have been reserved for certain communication systems (e.g., by a government entity such as the Federal Communications Commission (FCC) in the United States), these systems, in particular those employing small cell access points, have recently extended operation into unlicensed frequency bands such as the Unlicensed National Information Infrastructure (U-NII) band used by wireless local area network (WLAN) technologies, most notably IEEE 802.11x WLAN technologies generally referred to as "Wi-Fi." Example systems of this type include different variants of CDMA systems, TDMA systems, FDMA systems, orthogonal FDMA (OFDMA) systems, single-carrier FDMA (SC-FDMA) systems, and so on.

Note that although FIG. 1 only illustrates two of the UEs as SL-UEs (i.e., UEs 164 and 182), any of the illustrated UEs may be SL-UEs. Further, although only UE 182 was described as being capable of beamforming, any of the illustrated UEs, including UE 164, may be capable of beamforming. Where SL-UEs are capable of beamforming, they may beamform towards each other (i.e., towards other SL-UEs), towards other UEs (e.g., UEs 104), towards base stations (e.g., base stations 102, 180, small cell 102', access point 150), etc. Thus, in some cases, UEs 164 and 182 may utilize beamforming over sidelink 160.

In the example of FIG. 1, any of the illustrated UEs (shown in FIG. 1 as a single UE 104 for simplicity) may receive signals 124 from one or more Earth orbiting space vehicles (SVs) 112 (e.g., satellites). In an aspect, the SVs 112 may be part of a satellite positioning system that a UE 104 can use as an independent source of location information. A satellite positioning system typically includes a system of transmitters (e.g., SVs 112) positioned to enable receivers (e.g., UEs 104) to determine their location on or above the Earth based, at least in part, on positioning signals (e.g., signals 124) received from the transmitters. Such a transmitter typically transmits a signal marked with a repeating pseudo-random noise (PN) code of a set number of chips. While typically located in SVs 112, transmitters may sometimes be located on ground-based control stations, base stations 102, and/or other UEs 104. A UE 104 may include one or more dedicated receivers specifically designed to receive signals 124 for deriving geo location information from the SVs 112.

In a satellite positioning system, the use of signals 124 can be augmented by various satellite-based augmentation systems (SBAS) that may be associated with or otherwise enabled for use with one or more global and/or regional navigation satellite systems. For example an SBAS may include an augmentation system(s) that provides integrity information, differential corrections, etc., such as the Wide Area Augmentation System (WAAS), the European Geostationary Navigation Overlay Service (EGNOS), the Multi-functional Satellite Augmentation System (MSAS), the Global Positioning System (GPS) Aided Geo Augmented Navigation or GPS and Geo Augmented Navigation system (GAGAN), and/or the like. Thus, as used herein, a satellite positioning system may include any combination of one or more global and/or regional navigation satellites associated with such one or more satellite positioning systems.

In an aspect, SVs 112 may additionally or alternatively be part of one or more non-terrestrial networks (NTNs). In an NTN, an SV 112 is connected to an earth station (also referred to as a ground station, NTN gateway, or gateway), which in turn is connected to an element in a 5G network, such as a modified base station 102 (without a terrestrial antenna) or a network node in a 5GC. This element would in turn provide access to other elements in the 5G network and ultimately to entities external to the 5G network, such as Internet web servers and other user devices. In that way, a UE 104 may receive communication signals (e.g., signals 124) from an SV 112 instead of, or in addition to, communication signals from a terrestrial base station 102.

The wireless communications system 100 may further include one or more UEs, such as UE 190, that connects indirectly to one or more communication networks via one or more device-to-device (D2D) peer-to-peer (P2P) links (referred to as "sidelinks"). In the example of FIG. 1, UE 190 has a D2D P2P link 192 with one of the UEs 104 connected to one of the base stations 102 (e.g., through which UE 190 may indirectly obtain cellular connectivity) and a D2D P2P link 194 with WLAN STA 152 connected to the WLAN AP 150 (through which UE 190 may indirectly obtain WLAN-based Internet connectivity). In an example, the D2D P2P links 192 and 194 may be supported with any well-known D2D RAT, such as LTE Direct (LTE-D), WiFi Direct (WiFi-D), Bluetooth®, and so on.

Figure 2A:
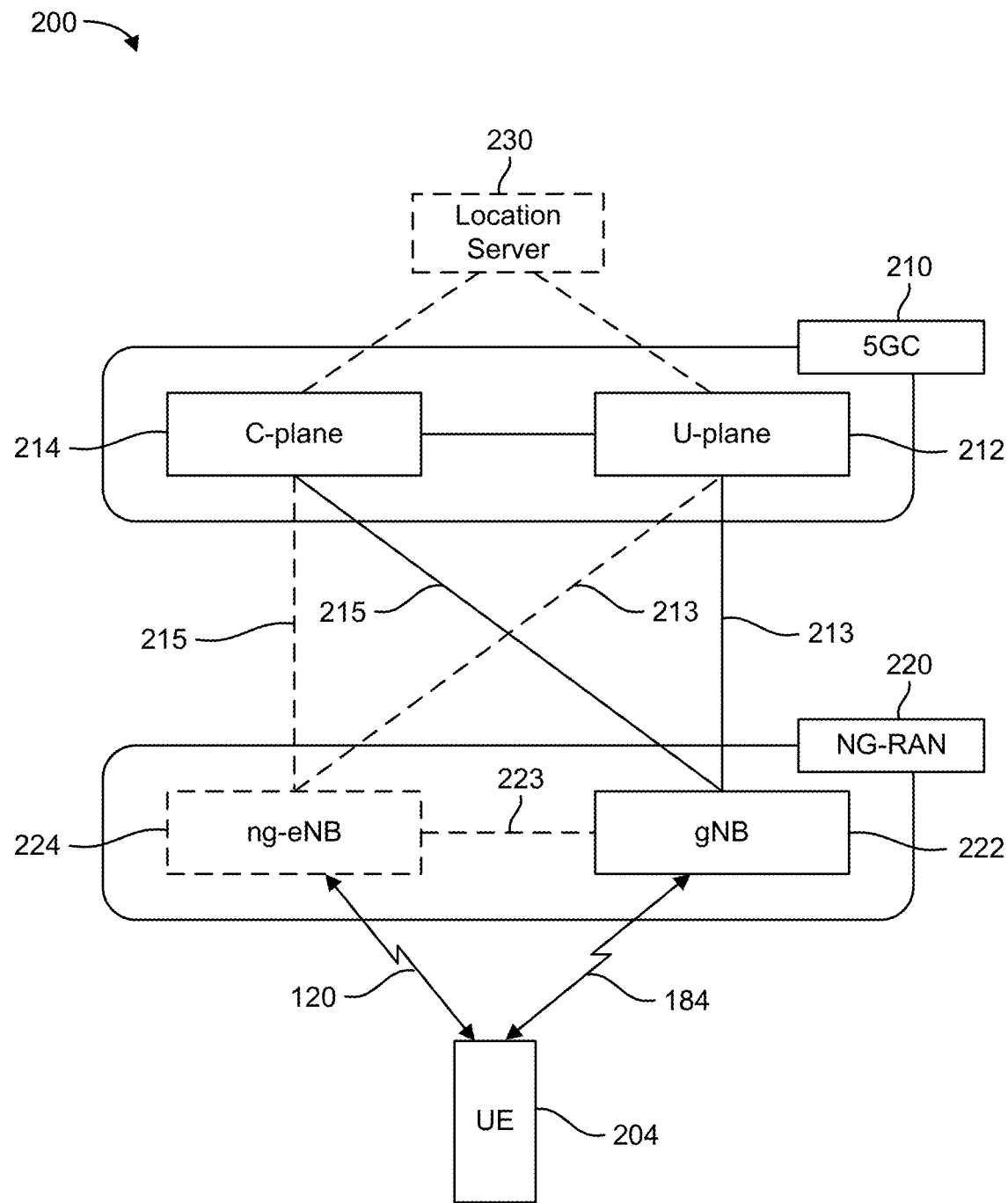
FIGS. 2A and 2B illustrate example wireless network structures, according to aspects of the disclosure.

FIG. 2A illustrates an example wireless network structure 200. For example, a 5GC 210 (also referred to as a Next Generation Core (NGC)) can be viewed functionally as control plane (C-plane) functions 214 (e.g., UE registration, authentication, network access, gateway selection, etc.) and user plane (U-plane) functions 212, (e.g., UE gateway function, access to data networks, IP routing, etc.) which operate cooperatively to form the core network. User plane interface (NG-U) 213 and control plane interface (NG-C) 215 connect the gNB 222 to the 5GC 210 and specifically to the user plane functions 212 and control plane functions 214, respectively. In an additional configuration, an ng-eNB 224 may also be connected to the 5GC 210 via NG-C 215 to the control plane functions 214 and NG-U 213 to user plane functions 212. Further, ng-eNB 224 may directly communicate with gNB 222 via a backhaul connection 223. In some configurations, a Next Generation RAN (NG-RAN) 220 may have one or more gNBs 222, while other configurations include one or more of both ng-eNBs 224 and gNBs 222. Either (or both) gNB 222 or ng-eNB 224 may communicate with one or more UEs 204 (e.g., any of the UEs described herein).

Another optional aspect may include a location server 230, which may be in communication with the 5GC 210 to provide location assistance for UE(s) 204. The location server 230 can be implemented as a plurality of separate servers (e.g., physically separate servers, different software modules on a single server, different software modules spread across multiple physical servers, etc.), or alternately may each correspond to a single server. The location server 230 can be configured to support one or more location services for UEs 204 that can connect to the location server 230 via the core network, 5GC 210, and/or via the Internet (not illustrated). Further, the location server 230 may be integrated into a component of the core network, or alternatively may be external to the core network (e.g., a third party server, such as an original equipment manufacturer (OEM) server or service server).

Figure 2B:
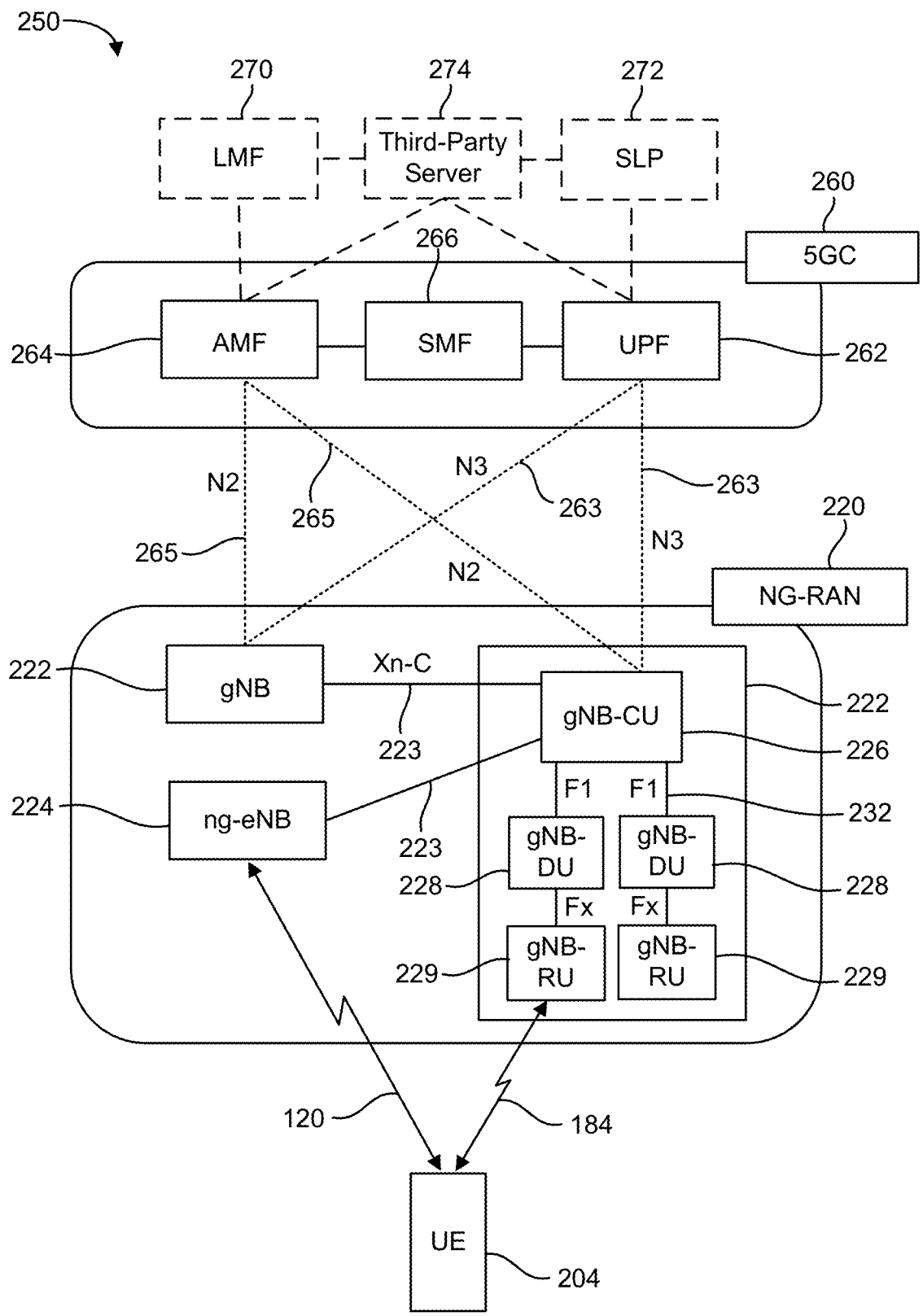

FIG. 2B illustrates another example wireless network structure 250. A 5GC 260 (which may correspond to 5GC 210 in FIG. 2A) can be viewed functionally as control plane functions, provided by an access and mobility management function (AMF) 264, and user plane functions, provided by a user plane function (UPF) 262, which operate cooperatively to form the core network (i.e., 5GC 260). The functions of the AMF 264 include registration management, connection management, reachability management, mobility management, lawful interception, transport for session management (SM) messages between one or more UEs 204 (e.g., any of the UEs described herein) and a session management function (SMF) 266, transparent proxy services for routing SM messages, access authentication and access authorization, transport for short message service (SMS) messages between the UE 204 and the short message service function (SMSF) (not shown), and security anchor functionality (SEAF). The AMF 264 also interacts with an authentication server function (AUSF) (not shown) and the UE 204, and receives the intermediate key that was established as a result of the UE 204 authentication process. In the case of authentication based on a UMTS (universal mobile telecommunications system) subscriber identity module (USIM), the AMF 264 retrieves the security material from the AUSF. The functions of the AMF 264 also include security context management (SCM). The SCM receives a key from the SEAF that it uses to derive access-network specific keys. The functionality of the AMF 264 also includes location services management for regulatory services, transport for location services messages between the UE 204 and a location management function (LMF) 270 (which acts as a location server 230), transport for location services messages between the NG-RAN 220 and the LMF 270, evolved packet system (EPS) bearer identifier allocation for interworking with the EPS, and UE 204 mobility event notification. In addition, the AMF 264 also supports functionalities for non-3GPP (Third Generation Partnership Project) access networks.

Functions of the UPF 262 include acting as an anchor point for intra-/inter-RAT mobility (when applicable), acting as an external protocol data unit (PDU) session point of interconnect to a data network (not shown), providing packet routing and forwarding, packet inspection, user plane policy rule enforcement (e.g., gating, redirection, traffic steering), lawful interception (user plane collection), traffic usage reporting, quality of service (QoS) handling for the user plane (e.g., uplink/downlink rate enforcement, reflective QoS marking in the downlink), uplink traffic verification (service data flow (SDF) to QoS flow mapping), transport level packet marking in the uplink and downlink, downlink packet buffering and downlink data notification triggering, and sending and forwarding of one or more "end markers" to the source RAN node. The UPF 262 may also support transfer of location services messages over a user plane between the UE 204 and a location server, such as an SLP 272.

The functions of the SMF 266 include session management, UE Internet protocol (IP) address allocation and management, selection and control of user plane functions, configuration of traffic steering at the UPF 262 to route traffic to the proper destination, control of part of policy enforcement and QoS, and downlink data notification. The interface over which the SMF 266 communicates with the AMF 264 is referred to as the N11 interface.

Another optional aspect may include an LMF 270, which may be in communication with the 5GC 260 to provide location assistance for UEs 204. The LMF 270 can be implemented as a plurality of separate servers (e.g., physically separate servers, different software modules on a single server, different software modules spread across multiple physical servers, etc.), or alternately may each correspond to a single server. The LMF 270 can be configured to support one or more location services for UEs 204 that can connect to the LMF 270 via the core network, 5GC 260, and/or via the Internet (not illustrated). The SLP 272 may support similar functions to the LMF 270, but whereas the LMF 270 may communicate with the AMF 264, NG-RAN 220, and UEs 204 over a control plane (e.g., using interfaces and protocols intended to convey signaling messages and not voice or data), the SLP 272 may communicate with UEs 204 and external clients (e.g., third-party server 274) over a user plane (e.g., using protocols intended to carry voice and/or data like the transmission control protocol (TCP) and/or IP).

Yet another optional aspect may include a third-party server 274, which may be in communication with the LMF 270, the SLP 272, the 5GC 260 (e.g., via the AMF 264 and/or the UPF 262), the NG-RAN 220, and/or the UE 204 to obtain location information (e.g., a location estimate) for the UE 204. As such, in some cases, the third-party server 274 may be referred to as a location services (LCS) client or an external client. The third-party server 274 can be implemented as a plurality of separate servers (e.g., physically separate servers, different software modules on a single server, different software modules spread across multiple physical servers, etc.), or alternately may each correspond to a single server.

User plane interface 263 and control plane interface 265 connect the 5GC 260, and specifically the UPF 262 and AMF 264, respectively, to one or more gNBs 222 and/or ng-eNBs 224 in the NG-RAN 220. The interface between gNB(s) 222 and/or ng-eNB(s) 224 and the AMF 264 is referred to as the "N2" interface, and the interface between gNB(s) 222 and/or ng-eNB(s) 224 and the UPF 262 is referred to as the "N3" interface. The gNB(s) 222 and/or ng-eNB(s) 224 of the NG-RAN 220 may communicate directly with each other via backhaul connections 223, referred to as the "Xn-C" interface. One or more of gNBs 222 and/or ng-eNBs 224 may communicate with one or more UEs 204 over a wireless interface, referred to as the "Uu" interface.

The functionality of a gNB 222 may be divided between a gNB central unit (gNB-CU) 226, one or more gNB distributed units (gNB-DUs) 228, and one or more gNB radio units (gNB-RUs) 229. A gNB-CU 226 is a logical node that includes the base station functions of transferring user data, mobility control, radio access network sharing, positioning, session management, and the like, except for those functions allocated exclusively to the gNB-DU(s) 228. More specifically, the gNB-CU 226 generally host the radio resource control (RRC), service data adaptation protocol (SDAP), and packet data convergence protocol (PDCP) protocols of the gNB 222. A gNB-DU 228 is a logical node that generally hosts the radio link control (RLC) and medium access control (MAC) layer of the gNB 222. Its operation is controlled by the gNB-CU 226. One gNB-DU 228 can support one or more cells, and one cell is supported by only one gNB-DU 228. The interface 232 between the gNB-CU 226 and the one or more gNB-DUs 228 is referred to as the "F1" interface. The physical (PHY) layer functionality of a gNB 222 is generally hosted by one or more standalone gNB-RUs 229 that perform functions such as power amplification and signal transmission/reception. The interface between a gNB-DU 228 and a gNB-RU 229 is referred to as the "Fx" interface. Thus, a UE 204 communicates with the gNB-CU 226 via the RRC, SDAP, and PDCP layers, with a gNB-DU 228 via the RLC and MAC layers, and with a gNB-RU 229 via the PHY layer.

Figure 3A:
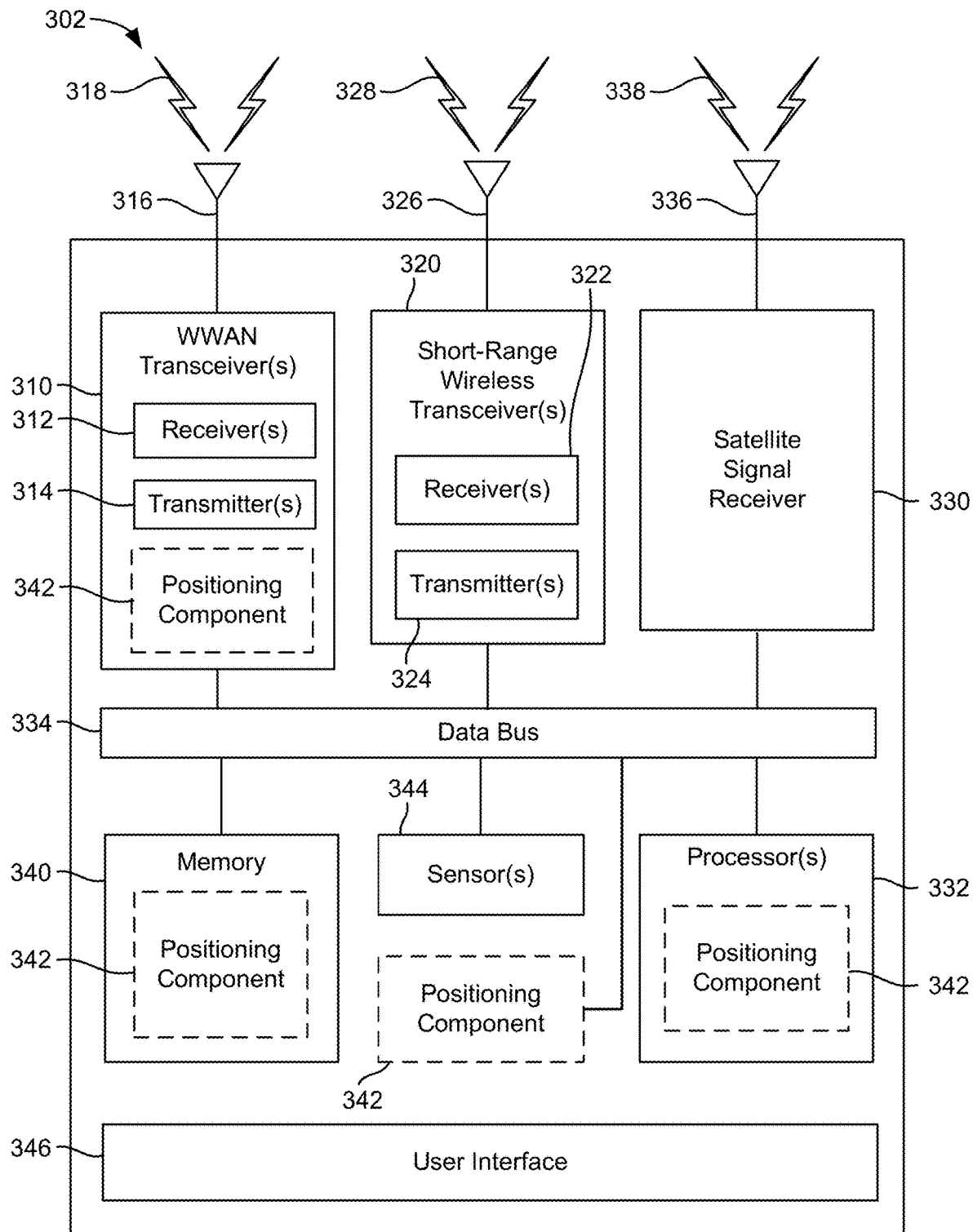
FIGS. 3A, 3B, and 3C are simplified block diagrams of several sample aspects of components that may be employed in a user equipment (UE), a base station, and a network entity, respectively, and configured to support communications as taught herein.
Figure 3B:
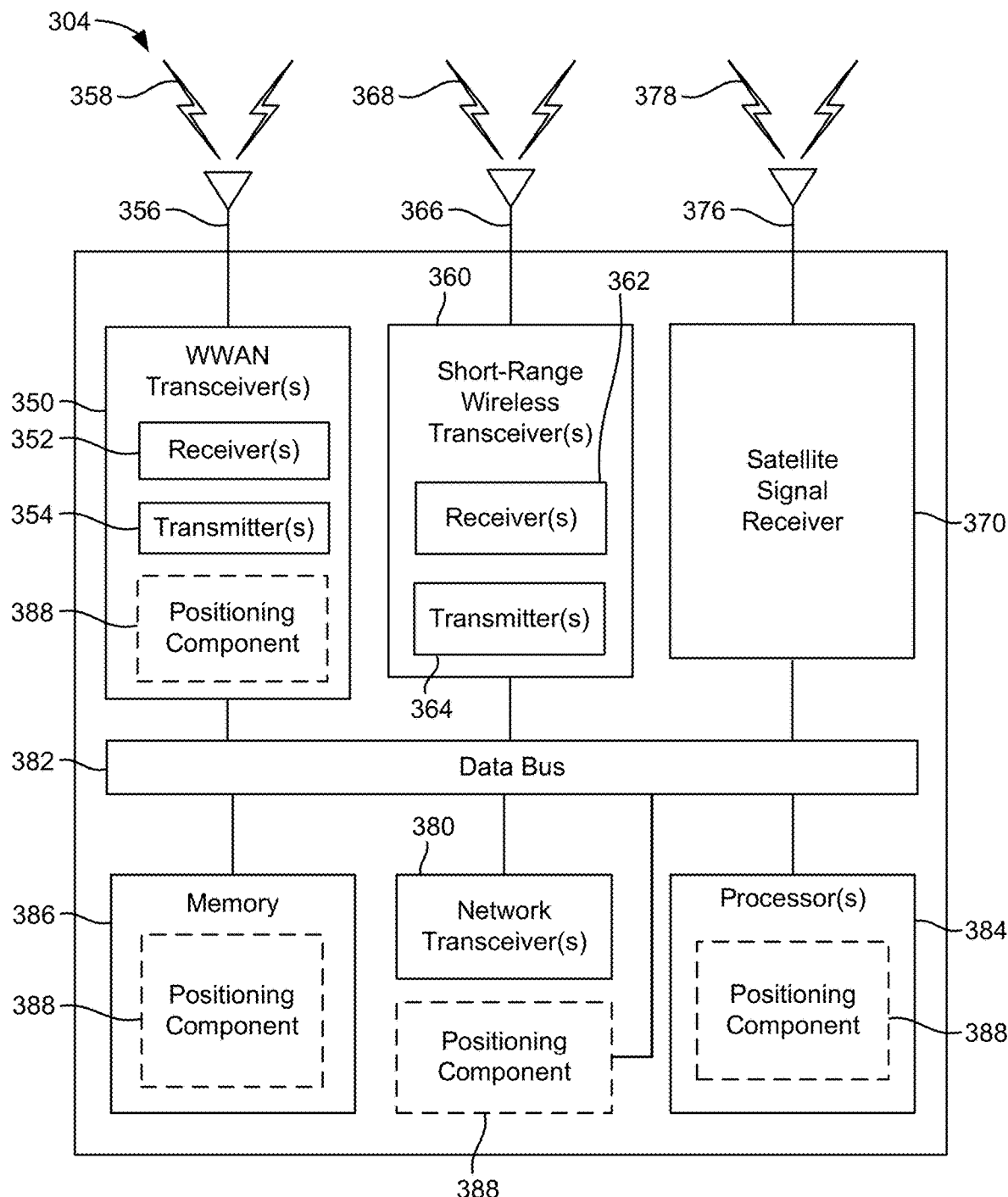
Figure 3C:
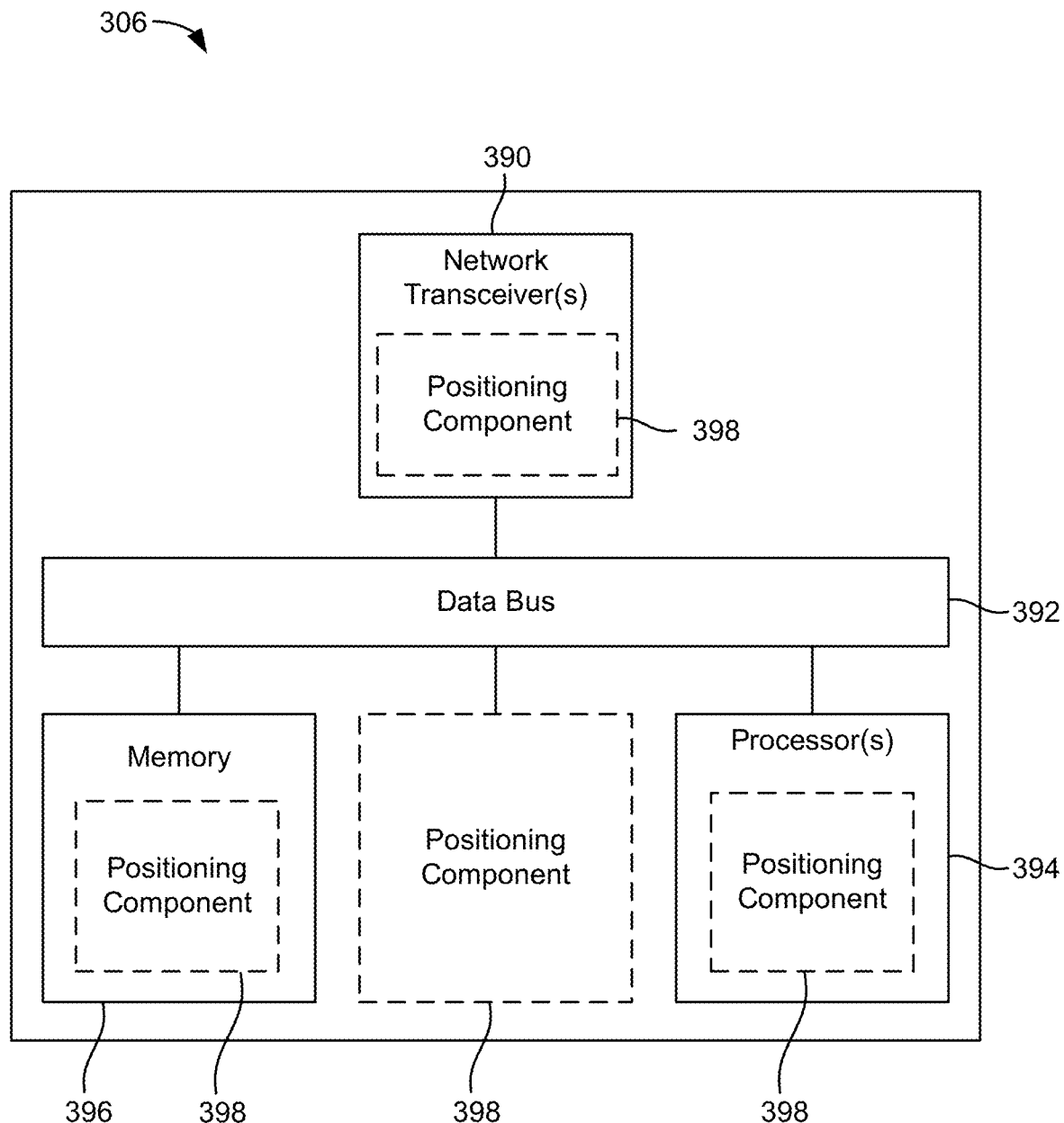

FIGS. 3A, 3B, and 3C illustrate several example components (represented by corresponding blocks) that may be incorporated into a UE 302 (which may correspond to any of the UEs described herein), a base station 304 (which may correspond to any of the base stations described herein), and a network entity 306 (which may correspond to or embody any of the network functions described herein, including the location server 230 and the LMF 270, or alternatively may be independent from the NG-RAN 220 and/or 5GC 210/260 infrastructure depicted in FIGS. 2A and 2B, such as a private network) to support the file transmission operations as taught herein. It will be appreciated that these components may be implemented in different types of apparatuses in different implementations (e.g., in an ASIC, in a system-on-chip (SoC), etc.). The illustrated components may also be incorporated into other apparatuses in a communication system. For example, other apparatuses in a system may include components similar to those described to provide similar functionality. Also, a given apparatus may contain one or more of the components. For example, an apparatus may include multiple transceiver components that enable the apparatus to operate on multiple carriers and/or communicate via different technologies.

The UE 302 and the base station 304 each include one or more wireless wide area network (WWAN) transceivers 310 and 350, respectively, providing means for communicating (e.g., means for transmitting, means for receiving, means for measuring, means for tuning, means for refraining from transmitting, etc.) via one or more wireless communication networks (not shown), such as an NR network, an LTE network, a GSM network, and/or the like. The WWAN transceivers 310 and 350 may each be connected to one or more antennas 316 and 356, respectively, for communicating with other network nodes, such as other UEs, access points, base stations (e.g., eNBs, gNBs), etc., via at least one designated RAT (e.g., NR, LTE, GSM, etc.) over a wireless communication medium of interest (e.g., some set of time/frequency resources in a particular frequency spectrum). The WWAN transceivers 310 and 350 may be variously configured for transmitting and encoding signals 318 and 358 (e.g., messages, indications, information, and so on), respectively, and, conversely, for receiving and decoding signals 318 and 358 (e.g., messages, indications, information, pilots, and so on), respectively, in accordance with the designated RAT. Specifically, the WWAN transceivers 310 and 350 include one or more transmitters 314 and 354, respectively, for transmitting and encoding signals 318 and 358, respectively, and one or more receivers 312 and 352, respectively, for receiving and decoding signals 318 and 358, respectively.

The UE 302 and the base station 304 each also include, at least in some cases, one or more short-range wireless transceivers 320 and 360, respectively. The short-range wireless transceivers 320 and 360 may be connected to one or more antennas 326 and 366, respectively, and provide means for communicating (e.g., means for transmitting, means for receiving, means for measuring, means for tuning, means for refraining from transmitting, etc.) with other network nodes, such as other UEs, access points, base stations, etc., via at least one designated RAT (e.g., WiFi, LTE-D, Bluetooth®, Zigbee®, Z-Wave®, PC5, dedicated short-range communications (DSRC), wireless access for vehicular environments (WAVE), near-field communication (NFC), etc.) over a wireless communication medium of interest. The short-range wireless transceivers 320 and 360 may be variously configured for transmitting and encoding signals 328 and 368 (e.g., messages, indications, information, and so on), respectively, and, conversely, for receiving and decoding signals 328 and 368 (e.g., messages, indications, information, pilots, and so on), respectively, in accordance with the designated RAT. Specifically, the short-range wireless transceivers 320 and 360 include one or more transmitters 324 and 364, respectively, for transmitting and encoding signals 328 and 368, respectively, and one or more receivers 322 and 362, respectively, for receiving and decoding signals 328 and 368, respectively. As specific examples, the short-range wireless transceivers 320 and 360 may be WiFi transceivers, Bluetooth® transceivers, Zigbee® and/or Z-Wave® transceivers, NFC transceivers, or vehicle-to-vehicle (V2V) and/or vehicle-to-everything (V2X) transceivers.

The UE 302 and the base station 304 also include, at least in some cases, satellite signal receivers 330 and 370. The satellite signal receivers 330 and 370 may be connected to one or more antennas 336 and 376, respectively, and may provide means for receiving and/or measuring satellite positioning/communication signals 338 and 378, respectively. Where the satellite signal receivers 330 and 370 are satellite positioning system receivers, the satellite positioning/communication signals 338 and 378 may be global positioning system (GPS) signals, global navigation satellite system (GLONASS) signals, Galileo signals, Beidou signals, Indian Regional Navigation Satellite System (NAVIC), Quasi-Zenith Satellite System (QZSS), etc. Where the satellite signal receivers 330 and 370 are non-terrestrial network (NTN) receivers, the satellite positioning/communication signals 338 and 378 may be communication signals (e.g., carrying control and/or user data) originating from a 5G network. The satellite signal receivers 330 and 370 may comprise any suitable hardware and/or software for receiving and processing satellite positioning/communication signals 338 and 378, respectively. The satellite signal receivers 330 and 370 may request information and operations as appropriate from the other systems, and, at least in some cases, perform calculations to determine locations of the UE 302 and the base station 304, respectively, using measurements obtained by any suitable satellite positioning system algorithm.

The base station 304 and the network entity 306 each include one or more network transceivers 380 and 390, respectively, providing means for communicating (e.g., means for transmitting, means for receiving, etc.) with other network entities (e.g., other base stations 304, other network entities 306). For example, the base station 304 may employ the one or more network transceivers 380 to communicate with other base stations 304 or network entities 306 over one or more wired or wireless backhaul links. As another example, the network entity 306 may employ the one or more network transceivers 390 to communicate with one or more base station 304 over one or more wired or wireless backhaul links, or with other network entities 306 over one or more wired or wireless core network interfaces.

A transceiver may be configured to communicate over a wired or wireless link. A transceiver (whether a wired transceiver or a wireless transceiver) includes transmitter circuitry (e.g., transmitters 314, 324, 354, 364) and receiver circuitry (e.g., receivers 312, 322, 352, 362). A transceiver may be an integrated device (e.g., embodying transmitter circuitry and receiver circuitry in a single device) in some implementations, may comprise separate transmitter circuitry and separate receiver circuitry in some implementations, or may be embodied in other ways in other implementations. The transmitter circuitry and receiver circuitry of a wired transceiver (e.g., network transceivers 380 and 390 in some implementations) may be coupled to one or more wired network interface ports. Wireless transmitter circuitry (e.g., transmitters 314, 324, 354, 364) may include or be coupled to a plurality of antennas (e.g., antennas 316, 326, 356, 366), such as an antenna array, that permits the respective apparatus (e.g., UE 302, base station 304) to perform transmit "beamforming," as described herein. Similarly, wireless receiver circuitry (e.g., receivers 312, 322, 352, 362) may include or be coupled to a plurality of antennas (e.g., antennas 316, 326, 356, 366), such as an antenna array, that permits the respective apparatus (e.g., UE 302, base station 304) to perform receive beamforming, as described herein. In an aspect, the transmitter circuitry and receiver circuitry may share the same plurality of antennas (e.g., antennas 316, 326, 356, 366), such that the respective apparatus can only receive or transmit at a given time, not both at the same time. A wireless transceiver (e.g., WWAN transceivers 310 and 350, short-range wireless transceivers 320 and 360) may also include a network listen module (NLM) or the like for performing various measurements.

As used herein, the various wireless transceivers (e.g., transceivers 310, 320, 350, and 360, and network transceivers 380 and 390 in some implementations) and wired transceivers (e.g., network transceivers 380 and 390 in some implementations) may generally be characterized as "a transceiver," "at least one transceiver," or "one or more transceivers." As such, whether a particular transceiver is a wired or wireless transceiver may be inferred from the type of communication performed. For example, backhaul communication between network devices or servers will generally relate to signaling via a wired transceiver, whereas wireless communication between a UE (e.g., UE 302) and a base station (e.g., base station 304) will generally relate to signaling via a wireless transceiver.

The UE 302, the base station 304, and the network entity 306 also include other components that may be used in conjunction with the operations as disclosed herein. The UE 302, the base station 304, and the network entity 306 include one or more processors 332, 384, and 394, respectively, for providing functionality relating to, for example, wireless communication, and for providing other processing functionality. The processors 332, 384, and 394 may therefore provide means for processing, such as means for determining, means for calculating, means for receiving, means for transmitting, means for indicating, etc. In an aspect, the processors 332, 384, and 394 may include, for example, one or more general purpose processors, multi-core processors, central processing units (CPUs), ASICs, digital signal processors (DSPs), field programmable gate arrays (FPGAs), other programmable logic devices or processing circuitry, or various combinations thereof.

The UE 302, the base station 304, and the network entity 306 include memory circuitry implementing memories 340, 386, and 396 (e.g., each including a memory device), respectively, for maintaining information (e.g., information indicative of reserved resources, thresholds, parameters, and so on). The memories 340, 386, and 396 may therefore provide means for storing, means for retrieving, means for maintaining, etc. In some cases, the UE 302, the base station 304, and the network entity 306 may include positioning component 342, 388, and 398, respectively. The positioning component 342, 388, and 398 may be hardware circuits that are part of or coupled to the processors 332, 384, and 394, respectively, that, when executed, cause the UE 302, the base station 304, and the network entity 306 to perform the functionality described herein. In other aspects, the positioning component 342, 388, and 398 may be external to the processors 332, 384, and 394 (e.g., part of a modem processing system, integrated with another processing system, etc.). Alternatively, the positioning component 342, 388, and 398 may be memory modules stored in the memories 340, 386, and 396, respectively, that, when executed by the processors 332, 384, and 394 (or a modem processing system, another processing system, etc.), cause the UE 302, the base station 304, and the network entity 306 to perform the functionality described herein. FIG. 3A illustrates possible locations of the positioning component 342, which may be, for example, part of the one or more WWAN transceivers 310, the memory 340, the one or more processors 332, or any combination thereof, or may be a standalone component. FIG. 3B illustrates possible locations of the positioning component 388, which may be, for example, part of the one or more WWAN transceivers 350, the memory 386, the one or more processors 384, or any combination thereof, or may be a standalone component. FIG. 3C illustrates possible locations of the positioning component 398, which may be, for example, part of the one or more network transceivers 390, the memory 396, the one or more processors 394, or any combination thereof, or may be a standalone component.

The UE 302 may include one or more sensors 344 coupled to the one or more processors 332 to provide means for sensing or detecting movement and/or orientation information that is independent of motion data derived from signals received by the one or more WWAN transceivers 310, the one or more short-range wireless transceivers 320, and/or the satellite signal receiver 330. By way of example, the sensor(s) 344 may include an accelerometer (e.g., a micro-electrical mechanical systems (MEMS) device), a gyroscope, a geomagnetic sensor (e.g., a compass), an altimeter (e.g., a barometric pressure altimeter), and/or any other type of movement detection sensor. Moreover, the sensor(s) 344 may include a plurality of different types of devices and combine their outputs in order to provide motion information. For example, the sensor(s) 344 may use a combination of a multi-axis accelerometer and orientation sensors to provide the ability to compute positions in two-dimensional (2D) and/or three-dimensional (3D) coordinate systems.

In addition, the UE 302 includes a user interface 346 providing means for providing indications (e.g., audible and/or visual indications) to a user and/or for receiving user input (e.g., upon user actuation of a sensing device such a keypad, a touch screen, a microphone, and so on). Although not shown, the base station 304 and the network entity 306 may also include user interfaces.

Referring to the one or more processors 384 in more detail, in the downlink, IP packets from the network entity 306 may be provided to the processor 384. The one or more processors 384 may implement functionality for an RRC layer, a packet data convergence protocol (PDCP) layer, a radio link control (RLC) layer, and a medium access control (MAC) layer. The one or more processors 384 may provide RRC layer functionality associated with broadcasting of system information (e.g., master information block (MIB), system information blocks (SIBs)), RRC connection control (e.g., RRC connection paging, RRC connection establishment, RRC connection modification, and RRC connection release), inter-RAT mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer PDUs, error correction through automatic repeat request (ARQ), concatenation, segmentation, and reassembly of RLC service data units (SDUs), re-segmentation of RLC data PDUs, and reordering of RLC data PDUs; and MAC layer functionality associated with mapping between logical channels and transport channels, scheduling information reporting, error correction, priority handling, and logical channel prioritization.

The transmitter 354 and the receiver 352 may implement Layer-1 (L1) functionality associated with various signal processing functions. Layer-1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The transmitter 354 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an orthogonal frequency division multiplexing (OFDM) subcarrier, multiplexed with a reference signal (e.g., pilot) in the time and/or frequency domain, and then combined together using an inverse fast Fourier transform (IFFT) to produce a physical channel carrying a time domain OFDM symbol stream. The OFDM symbol stream is spatially precoded to produce multiple spatial streams. Channel estimates from a channel estimator may be used to determine the coding and modulation scheme, as well as for spatial processing. The channel estimate may be derived from a reference signal and/or channel condition feedback transmitted by the UE 302. Each spatial stream may then be provided to one or more different antennas 356. The transmitter 354 may modulate an RF carrier with a respective spatial stream for transmission.

At the UE 302, the receiver 312 receives a signal through its respective antenna(s) 316. The receiver 312 recovers information modulated onto an RF carrier and provides the information to the one or more processors 332. The transmitter 314 and the receiver 312 implement Layer-1 functionality associated with various signal processing functions. The receiver 312 may perform spatial processing on the information to recover any spatial streams destined for the UE 302. If multiple spatial streams are destined for the UE 302, they may be combined by the receiver 312 into a single OFDM symbol stream. The receiver 312 then converts the OFDM symbol stream from the time-domain to the frequency domain using a fast Fourier transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 304. These soft decisions may be based on channel estimates computed by a channel estimator. The soft decisions are then decoded and de-interleaved to recover the data and control signals that were originally transmitted by the base station 304 on the physical channel. The data and control signals are then provided to the one or more processors 332, which implements Layer-3 (L3) and Layer-2 (L2) functionality.

In the uplink, the one or more processors 332 provides demultiplexing between transport and logical channels, packet reassembly, deciphering, header decompression, and control signal processing to recover IP packets from the core network. The one or more processors 332 are also responsible for error detection.

Similar to the functionality described in connection with the downlink transmission by the base station 304, the one or more processors 332 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through hybrid automatic repeat request (HARQ), priority handling, and logical channel prioritization.

Channel estimates derived by the channel estimator from a reference signal or feedback transmitted by the base station 304 may be used by the transmitter 314 to select the appropriate coding and modulation schemes, and to facilitate spatial processing. The spatial streams generated by the transmitter 314 may be provided to different antenna(s) 316. The transmitter 314 may modulate an RF carrier with a respective spatial stream for transmission.

The uplink transmission is processed at the base station 304 in a manner similar to that described in connection with the receiver function at the UE 302. The receiver 352 receives a signal through its respective antenna(s) 356. The receiver 352 recovers information modulated onto an RF carrier and provides the information to the one or more processors 384.

In the uplink, the one or more processors 384 provides demultiplexing between transport and logical channels, packet reassembly, deciphering, header decompression, control signal processing to recover IP packets from the UE 302. IP packets from the one or more processors 384 may be provided to the core network. The one or more processors 384 are also responsible for error detection.

For convenience, the UE 302, the base station 304, and/or the network entity 306 are shown in FIGS. 3A, 3B, and 3C as including various components that may be configured according to the various examples described herein. It will be appreciated, however, that the illustrated components may have different functionality in different designs. In particular, various components in FIGS. 3A to 3C are optional in alternative configurations and the various aspects include configurations that may vary due to design choice, costs, use of the device, or other considerations. For example, in case of FIG. 3A, a particular implementation of UE 302 may omit the WWAN transceiver(s) 310 (e.g., a wearable device or tablet computer or PC or laptop may have Wi-Fi and/or Bluetooth capability without cellular capability), or may omit the short-range wireless transceiver(s) 320 (e.g., cellular-only, etc.), or may omit the satellite signal receiver 330, or may omit the sensor(s) 344, and so on. In another example, in case of FIG. 3B, a particular implementation of the base station 304 may omit the WWAN transceiver(s) 350 (e.g., a Wi-Fi "hotspot" access point without cellular capability), or may omit the short-range wireless transceiver(s) 360 (e.g., cellular-only, etc.), or may omit the satellite receiver 370, and so on. For brevity, illustration of the various alternative configurations is not provided herein, but would be readily understandable to one skilled in the art.

The various components of the UE 302, the base station 304, and the network entity 306 may be communicatively coupled to each other over data buses 334, 382, and 392, respectively. In an aspect, the data buses 334, 382, and 392 may form, or be part of, a communication interface of the UE 302, the base station 304, and the network entity 306, respectively. For example, where different logical entities are embodied in the same device (e.g., gNB and location server functionality incorporated into the same base station 304), the data buses 334, 382, and 392 may provide communication between them.

The components of FIGS. 3A, 3B, and 3C may be implemented in various ways. In some implementations, the components of FIGS. 3A, 3B, and 3C may be implemented in one or more circuits such as, for example, one or more processors and/or one or more ASICs (which may include one or more processors). Here, each circuit may use and/or incorporate at least one memory component for storing information or executable code used by the circuit to provide this functionality. For example, some or all of the functionality represented by blocks 310 to 346 may be implemented by processor and memory component(s) of the UE 302 (e.g., by execution of appropriate code and/or by appropriate configuration of processor components). Similarly, some or all of the functionality represented by blocks 350 to 388 may be implemented by processor and memory component(s) of the base station 304 (e.g., by execution of appropriate code and/or by appropriate configuration of processor components). Also, some or all of the functionality represented by blocks 390 to 398 may be implemented by processor and memory component(s) of the network entity 306 (e.g., by execution of appropriate code and/or by appropriate configuration of processor components). For simplicity, various operations, acts, and/or functions are described herein as being performed "by a UE," "by a base station," "by a network entity," etc. However, as will be appreciated, such operations, acts, and/or functions may actually be performed by specific components or combinations of components of the UE 302, base station 304, network entity 306, etc., such as the processors 332, 384, 394, the transceivers 310, 320, 350, and 360, the memories 340, 386, and 396, the positioning component 342, 388, and 398, etc.

In some designs, the network entity 306 may be implemented as a core network component. In other designs, the network entity 306 may be distinct from a network operator or operation of the cellular network infrastructure (e.g., NG RAN 220 and/or 5GC 210/260). For example, the network entity 306 may be a component of a private network that may be configured to communicate with the UE 302 via the base station 304 or independently from the base station 304 (e.g., over a non-cellular communication link, such as WiFi).

Figure 4:
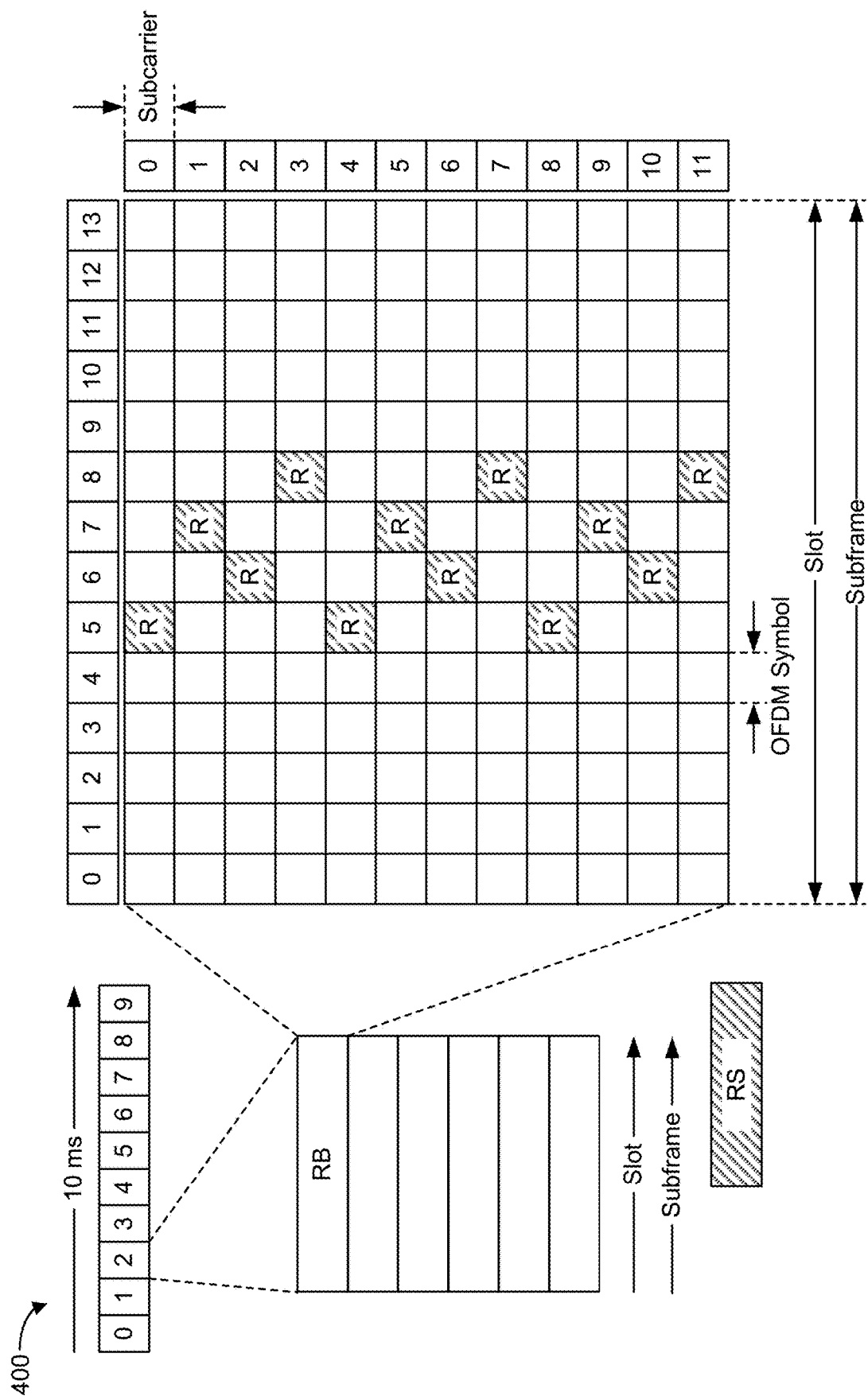
FIG. 4 is a diagram illustrating an example frame structure, according to aspects of the disclosure.

Various frame structures may be used to support downlink and uplink transmissions between network nodes (e.g., base stations and UEs). FIG. 4 is a diagram 400 illustrating an example frame structure, according to aspects of the disclosure. The frame structure may be a downlink or uplink frame structure. Other wireless communications technologies may have different frame structures and/or different channels.

LTE, and in some cases NR, utilizes OFDM on the downlink and single-carrier frequency division multiplexing (SC-FDM) on the uplink. Unlike LTE, however, NR has an option to use OFDM on the uplink as well. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kilohertz (kHz) and the minimum resource allocation (resource block) may be 12 subcarriers (or 180 kHz). Consequently, the nominal FFT size may be equal to 128, 256, 512, 1024, or 2048 for system bandwidth of 1.25, 2.5, 5, 10, or 20 megahertz (MHz), respectively. The system bandwidth may also be partitioned into subbands. For example, a subband may cover 1.08 MHz (i.e., 6 resource blocks), and there may be 1, 2, 4, 8, or 16 subbands for system bandwidth of 1.25, 2.5, 5, 10, or 20 MHz, respectively.

LTE supports a single numerology (subcarrier spacing (SCS), symbol length, etc.). In contrast, NR may support multiple numerologies (µ), for example, subcarrier spacings of 15 kHz (µ=0), 30 kHz (µ=1), 60 kHz (µ=2), 120 kHz (µ=3), and 240 kHz (µ=4) or greater may be available. In each subcarrier spacing, there are 14 symbols per slot. For 15 kHz SCS (µ=0), there is one slot per subframe, 10 slots per frame, the slot duration is 1 millisecond (ms), the symbol duration is 66.7 microseconds (µs), and the maximum nominal system bandwidth (in MHz) with a 4K FFT size is 50. For 30 kHz SCS (µ=1), there are two slots per subframe, 20 slots per frame, the slot duration is 0.5 ms, the symbol duration is 33.3 µs, and the maximum nominal system bandwidth (in MHz) with a 4K FFT size is 100. For 60 kHz SCS (µ=2), there are four slots per subframe, 40 slots per frame, the slot duration is 0.25 ms, the symbol duration is 16.7 µs, and the maximum nominal system bandwidth (in MHz) with a 4K FFT size is 200. For 120 kHz SCS (µ=3), there are eight slots per subframe, 80 slots per frame, the slot duration is 0.125 ms, the symbol duration is 8.33 µs, and the maximum nominal system bandwidth (in MHz) with a 4K FFT size is 400. For 240 kHz SCS (µ=4), there are 16 slots per subframe, 160 slots per frame, the slot duration is 0.0625 ms, the symbol duration is 4.17 µs, and the maximum nominal system bandwidth (in MHz) with a 4K FFT size is 800.

In the example of FIG. 4, a numerology of 15 kHz is used. Thus, in the time domain, a 10 ms frame is divided into 10 equally sized subframes of 1 ms each, and each subframe includes one time slot. In FIG. 4, time is represented horizontally (on the X axis) with time increasing from left to right, while frequency is represented vertically (on the Y axis) with frequency increasing (or decreasing) from bottom to top.

A resource grid may be used to represent time slots, each time slot including one or more time-concurrent resource blocks (RBs) (also referred to as physical RBs (PRBs)) in the frequency domain. The resource grid is further divided into multiple resource elements (REs). An RE may correspond to one symbol length in the time domain and one subcarrier in the frequency domain. In the numerology of FIG. 4, for a normal cyclic prefix, an RB may contain 12 consecutive subcarriers in the frequency domain and seven consecutive symbols in the time domain, for a total of 84 REs. For an extended cyclic prefix, an RB may contain 12 consecutive subcarriers in the frequency domain and six consecutive symbols in the time domain, for a total of 72 REs. The number of bits carried by each RE depends on the modulation scheme.

Some of the REs may carry reference (pilot) signals (RS). The reference signals may include positioning reference signals (PRS), tracking reference signals (TRS), phase tracking reference signals (PTRS), cell-specific reference signals (CRS), channel state information reference signals (CSI-RS), demodulation reference signals (DMRS), primary synchronization signals (PSS), secondary synchronization signals (SSS), synchronization signal blocks (SSBs), sounding reference signals (SRS), etc., depending on whether the illustrated frame structure is used for uplink or downlink communication. FIG. 4 illustrates example locations of REs carrying a reference signal (labeled "R").

A collection of resource elements (REs) that are used for transmission of PRS is referred to as a "PRS resource." The collection of resource elements can span multiple PRBs in the frequency domain and 'N' (such as 1 or more) consecutive symbol(s) within a slot in the time domain. In a given OFDM symbol in the time domain, a PRS resource occupies consecutive PRBs in the frequency domain.

The transmission of a PRS resource within a given PRB has a particular comb size (also referred to as the "comb density"). A comb size 'N' represents the subcarrier spacing (or frequency/tone spacing) within each symbol of a PRS resource configuration. Specifically, for a comb size 'N,' PRS are transmitted in every Nth subcarrier of a symbol of a PRB. For example, for comb-4, for each symbol of the PRS resource configuration, REs corresponding to every fourth subcarrier (such as subcarriers 0, 4, 8) are used to transmit PRS of the PRS resource. Currently, comb sizes of comb-2, comb-4, comb-6, and comb-12 are supported for DL-PRS. FIG. 4 illustrates an example PRS resource configuration for comb-4 (which spans four symbols). That is, the locations of the shaded REs (labeled "R") indicate a comb-4 PRS resource configuration.

Currently, a DL-PRS resource may span 2, 4, 6, or 12 consecutive symbols within a slot with a fully frequency-domain staggered pattern. A DL-PRS resource can be configured in any higher layer configured downlink or flexible (FL) symbol of a slot. There may be a constant energy per resource element (EPRE) for all REs of a given DL-PRS resource. The following are the frequency offsets from symbol to symbol for comb sizes 2, 4, 6, and 12 over 2, 4, 6, and 12 symbols. 2-symbol comb-2: {0, 1}; 4-symbol comb-2: {0, 1, 0, 1}; 6-symbol comb-2: {0, 1, 0, 1, 0, 1}; 12-symbol comb-2: {0, 1, 0, 1, 0, 1, 0, 1, 0, 1, 0, 1}; 4-symbol comb-4: {0, 2, 1, 3} (as in the example of FIG. 4); 12-symbol comb-4: {0, 2, 1, 3, 0, 2, 1, 3, 0, 2, 1, 3}; 6-symbol comb-6: {0, 3, 1, 4, 2, 5}; 12-symbol comb-6: {0, 3, 1, 4, 2, 5, 0, 3, 1, 4, 2, 5}; and 12-symbol comb-12: {0, 6, 3, 9, 1, 7, 4, 10, 2, 8, 5, 11}.

A "PRS resource set" is a set of PRS resources used for the transmission of PRS signals, where each PRS resource has a PRS resource ID. In addition, the PRS resources in a PRS resource set are associated with the same TRP. A PRS resource set is identified by a PRS resource set ID and is associated with a particular TRP (identified by a TRP ID). In addition, the PRS resources in a PRS resource set have the same periodicity, a common muting pattern configuration, and the same repetition factor (such as "PRS-ResourceRepetitionFactor") across slots. The periodicity is the time from the first repetition of the first PRS resource of a first PRS instance to the same first repetition of the same first PRS resource of the next PRS instance. The periodicity may have a length selected from $2^\mu*\{4, 5, 8, 10, 16, 20, 32, 40, 64, 80, 160, 320, 640, 1280, 2560, 5120, 10240\}$ slots, with $\mu=0, 1, 2, 3$. The repetition factor may have a length selected from $\{1, 2, 4, 6, 8, 16, 32\}$ slots.

A PRS resource ID in a PRS resource set is associated with a single beam (or beam ID) transmitted from a single TRP (where a TRP may transmit one or more beams). That is, each PRS resource of a PRS resource set may be transmitted on a different beam, and as such, a "PRS resource," or simply "resource," also can be referred to as a "beam." Note that this does not have any implications on whether the TRPs and the beams on which PRS are transmitted are known to the UE.

A "PRS instance" or "PRS occasion" is one instance of a periodically repeated time window (such as a group of one or more consecutive slots) where PRS are expected to be transmitted. A PRS occasion also may be referred to as a "PRS positioning occasion," a "PRS positioning instance, a "positioning occasion," "a positioning instance," a "positioning repetition," or simply an "occasion," an "instance," or a "repetition."

A "positioning frequency layer" (also referred to simply as a "frequency layer") is a collection of one or more PRS resource sets across one or more TRPs that have the same values for certain parameters. Specifically, the collection of PRS resource sets has the same subcarrier spacing and cyclic prefix (CP) type (meaning all numerologies supported for the physical downlink shared channel (PDSCH) are also supported for PRS), the same Point A, the same value of the downlink PRS bandwidth, the same start PRB (and center frequency), and the same comb-size. The Point A parameter takes the value of the parameter "ARFCN-ValueNR" (where "ARFCN" stands for "absolute radio-frequency channel number") and is an identifier/code that specifies a pair of physical radio channel used for transmission and reception. The downlink PRS bandwidth may have a granularity of four PRBs, with a minimum of 24 PRBs and a maximum of 272 PRBs. Currently, up to four frequency layers have been defined, and up to two PRS resource sets may be configured per TRP per frequency layer.

The concept of a frequency layer is somewhat like the concept of component carriers and bandwidth parts (BWPs), but different in that component carriers and BWPs are used by one base station (or a macro cell base station and a small cell base station) to transmit data channels, while frequency layers are used by several (usually three or more) base stations to transmit PRS. A UE may indicate the number of frequency layers it can support when it sends the network its positioning capabilities, such as during an LTE positioning protocol (LPP) session. For example, a UE may indicate whether it can support one or four positioning frequency layers.

Figure 5:
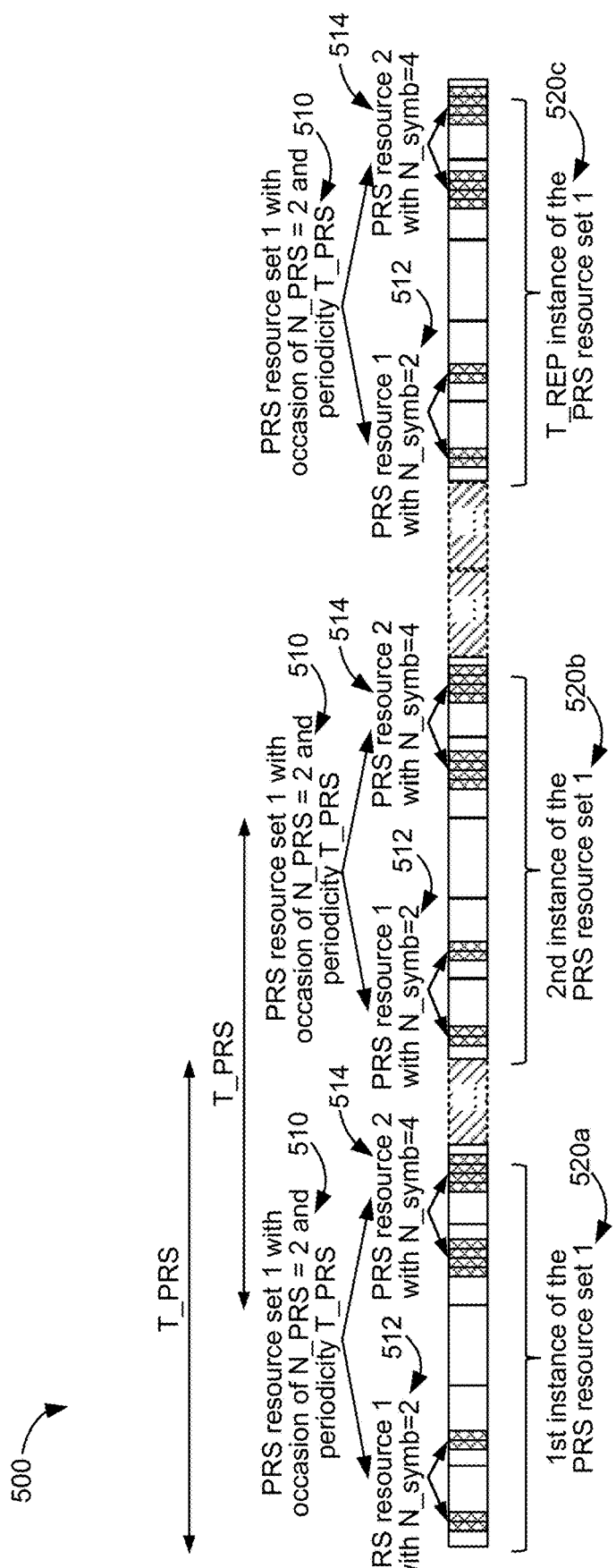
FIG. 5 is a diagram of an example positioning reference signal (PRS) configuration for the PRS transmissions of a given base station, according to aspects of the disclosure.

FIG. 5 is a diagram of an example PRS configuration 500 for the PRS transmissions of a given base station, according to aspects of the disclosure. In FIG. 5, time is represented horizontally, increasing from left to right. Each long rectangle represents a slot and each short (shaded) rectangle represents an OFDM symbol. In the example of FIG. 5, a PRS resource set 510 labeled "PRS resource set 1") includes two PRS resources, a first PRS resource 512 (labeled "PRS resource 1") and a second PRS resource 514 (labeled "PRS resource 2"). The base station transmits PRS on the PRS resources 512 and 514 of the PRS resource set 510.

The PRS resource set 510 has an occasion length (N_PRS) of two slots and a periodicity (T_PRS) of, for example, 160 slots or 160 milliseconds (ms) (for 15 kHz subcarrier spacing). As such, both the PRS resources 512 and 514 are two consecutive slots in length and repeat every T_PRS slots, starting from the slot in which the first symbol of the respective PRS resource occurs. In the example of FIG. 5, the PRS resource 512 has a symbol length (N_symb) of two symbols, and the PRS resource 514 has a symbol length (N_symb) of four symbols. The PRS resource 512 and the PRS resource 514 may be transmitted on separate beams of the same base station.

Each instance of the PRS resource set 510, illustrated as instances 520a, 520b, and 520c, includes an occasion of length '2' (i.e., N_PRS=2) for each PRS resource 512, 514 of the PRS resource set. The PRS resources 512 and 514 are repeated every T_PRS slots up to the muting sequence periodicity T_REP. As such, a bitmap of length T_REP would be needed to indicate which occasions of instances 520*a*, 520*b*, and 520*c* of PRS resource set 510 are muted (i.e., not transmitted).

In an aspect, there may be additional constraints on the PRS configuration 500. For example, for all PRS resources (e.g., PRS resources 512, 514) of a PRS resource set (e.g., PRS resource set 510), the base station can configure the following parameters to be the same: (a) the occasion length (N_PRS), (b) the number of symbols (N_symb), (c) the comb type, and/or (d) the bandwidth. In addition, for all PRS resources of all PRS resource sets, the subcarrier spacing and the cyclic prefix can be configured to be the same for one base station or for all base stations. Whether it is for one base station or all base stations may depend on the UE's capability to support the first and/or second option.

Note that the terms "positioning reference signal" and "PRS" generally refer to specific reference signals that are used for positioning in NR and LTE systems. However, as used herein, the terms "positioning reference signal" and "PRS" may also refer to any type of reference signal that can be used for positioning, such as but not limited to, PRS as defined in LTE and NR, TRS, PTRS, CRS, CSI-RS, DMRS, PSS, SSS, SSB, SRS, UL-PRS, etc. In addition, the terms "positioning reference signal" and "PRS" may refer to downlink or uplink positioning reference signals, unless otherwise indicated by the context. If needed to further distinguish the type of PRS, a downlink positioning reference signal may be referred to as a "DL-PRS," and an uplink positioning reference signal (e.g., an SRS-for-positioning, PTRS) may be referred to as an "UL-PRS." In addition, for signals that may be transmitted in both the uplink and downlink (e.g., DMRS, PTRS), the signals may be prepended with "UL" or "DL" to distinguish the direction. For example, "UL-DMRS" may be differentiated from "DL-DMRS."

NR supports a number of cellular network-based positioning technologies, including downlink-based, uplink-based, and downlink-and-uplink-based positioning methods. Downlink-based positioning methods include observed time difference of arrival (OTDOA) in LTE, downlink time difference of arrival (DL-TDOA) in NR, and downlink angle-of-departure (DL-AoD) in NR. In an OTDOA or DL-TDOA positioning procedure, a UE measures the differences between the times of arrival (ToAs) of reference signals (e.g., positioning reference signals (PRS)) received from pairs of base stations, referred to as reference signal time difference (RSTD) or time difference of arrival (TDOA) measurements, and reports them to a positioning entity. More specifically, the UE receives the identifiers (IDs) of a reference base station (e.g., a serving base station) and multiple non-reference base stations in assistance data. The UE then measures the RSTD between the reference base station and each of the non-reference base stations. Based on the known locations of the involved base stations and the RSTD measurements, the positioning entity (e.g., the UE for UE-based positioning or a location server for UE-assisted positioning) can estimate the UE's location.

For DL-AoD positioning, the positioning entity uses a measurement report from the UE of received signal strength measurements of multiple downlink transmit beams to determine the angle(s) between the UE and the transmitting base station(s). The positioning entity can then estimate the location of the UE based on the determined angle(s) and the known location(s) of the transmitting base station(s).

Uplink-based positioning methods include uplink time difference of arrival (UL-TDOA) and uplink angle-of-arrival (UL-AoA). UL-TDOA is similar to DL-TDOA, but is based on uplink reference signals (e.g., sounding reference signals (SRS)) transmitted by the UE to multiple base stations. Specifically, a UE transmits one or more uplink reference signals that are measured by a reference base station and a plurality of non-reference base stations. Each base station then reports the reception time (referred to as the relative time of arrival (RTOA)) of the reference signal(s) to a positioning entity (e.g., a location server) that knows the locations and relative timing of the involved base stations. Based on the reception-to-reception (Rx-Rx) time difference between the reported RTOA of the reference base station and the reported RTOA of each non-reference base station, the known locations of the base stations, and their known timing offsets, the positioning entity can estimate the location of the UE using TDOA.

For UL-AoA positioning, one or more base stations measure the received signal strength of one or more uplink reference signals (e.g., SRS) received from a UE on one or more uplink receive beams. The positioning entity uses the signal strength measurements and the angle(s) of the receive beam(s) to determine the angle(s) between the UE and the base station(s). Based on the determined angle(s) and the known location(s) of the base station(s), the positioning entity can then estimate the location of the UE.

Downlink-and-uplink-based positioning methods include enhanced cell-ID (E-CID) positioning and multi-round-trip-time (RTT) positioning (also referred to as "multi-cell RTT" and "multi-RTT"). In an RTT procedure, a first entity (e.g., a base station or a UE) transmits a first RTT-related signal (e.g., a PRS or SRS) to a second entity (e.g., a UE or base station), which transmits a second RTT-related signal (e.g., an SRS or PRS) back to the first entity. Each entity measures the time difference between the time of arrival (ToA) of the received RTT-related signal and the transmission time of the transmitted RTT-related signal. This time difference is referred to as a reception-to-transmission (Rx-Tx) time difference. The Rx-Tx time difference measurement may be made, or may be adjusted, to include only a time difference between nearest slot boundaries for the received and transmitted signals. Both entities may then send their Rx-Tx time difference measurement to a location server (e.g., an LMF 270), which calculates the round trip propagation time (i.e., RTT) between the two entities from the two Rx-Tx time difference measurements (e.g., as the sum of the two Rx-Tx time difference measurements). Alternatively, one entity may send its Rx-Tx time difference measurement to the other entity, which then calculates the RTT. The distance between the two entities can be determined from the RTT and the known signal speed (e.g., the speed of light). For multi-RTT positioning, a first entity (e.g., a UE or base station) performs an RTT positioning procedure with multiple second entities (e.g., multiple base stations or UEs) to enable the location of the first entity to be determined (e.g., using multilateration) based on distances to, and the known locations of, the second entities. RTT and multi-RTT methods can be combined with other positioning techniques, such as UL-AoA and DL-AoD, to improve location accuracy.

The E-CID positioning method is based on radio resource management (RRM) measurements. In E-CID, the UE reports the serving cell ID, the timing advance (TA), and the identifiers, estimated timing, and signal strength of detected neighbor base stations. The location of the UE is then estimated based on this information and the known locations of the base station(s).

To assist positioning operations, a location server (e.g., location server 230, LMF 270, SLP 272) may provide assistance data to the UE. For example, the assistance data may include identifiers of the base stations (or the cells/TRPs of the base stations) from which to measure reference signals, the reference signal configuration parameters (e.g., the number of consecutive slots including PRS, periodicity of the consecutive slots including PRS, muting sequence, frequency hopping sequence, reference signal identifier, reference signal bandwidth, etc.), and/or other parameters applicable to the particular positioning method. Alternatively, the assistance data may originate directly from the base stations themselves (e.g., in periodically broadcasted overhead messages, etc.). In some cases, the UE may be able to detect neighbor network nodes itself without the use of assistance data.

In the case of an OTDOA or DL-TDOA positioning procedure, the assistance data may further include an expected RSTD value and an associated uncertainty, or search window, around the expected RSTD. In some cases, the value range of the expected RSTD may be +/−500 microseconds (μs). In some cases, when any of the resources used for the positioning measurement are in FR1, the value range for the uncertainty of the expected RSTD may be +/−32 μs. In other cases, when all of the resources used for the positioning measurement(s) are in FR2, the value range for the uncertainty of the expected RSTD may be +/−8 μs.

A location estimate may be referred to by other names, such as a position estimate, location, position, position fix, fix, or the like. A location estimate may be geodetic and comprise coordinates (e.g., latitude, longitude, and possibly altitude) or may be civic and comprise a street address, postal address, or some other verbal description of a location. A location estimate may further be defined relative to some other known location or defined in absolute terms (e.g., using latitude, longitude, and possibly altitude). A location estimate may include an expected error or uncertainty (e.g., by including an area or volume within which the location is expected to be included with some specified or default level of confidence).

Figure 6:
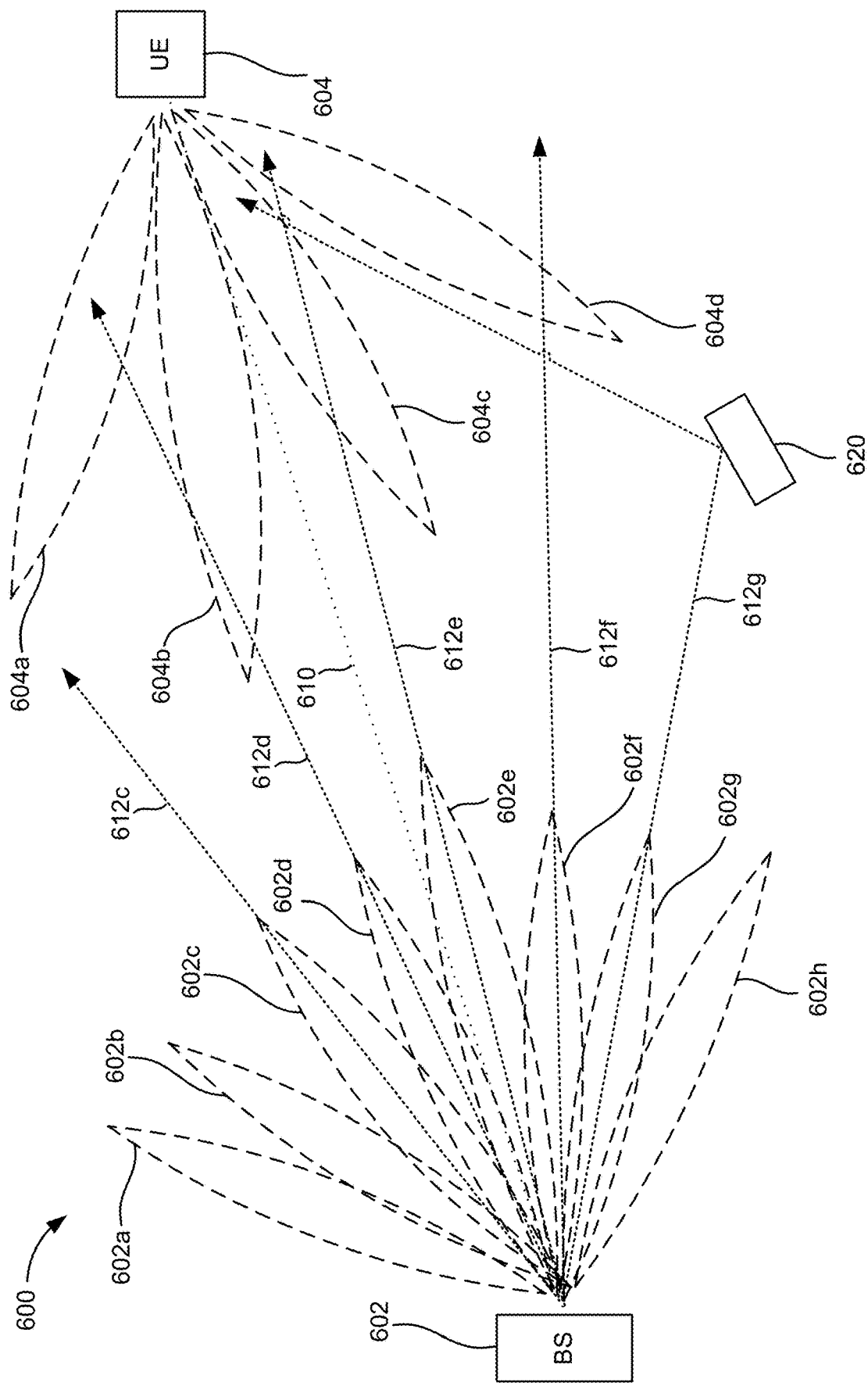
FIG. 6 is a diagram illustrating an example base station in communication with an example UE, according to aspects of the disclosure.

FIG. 6 is a diagram 600 illustrating a base station (BS) 602 (which may correspond to any of the base stations described herein) in communication with a UE 604 (which may correspond to any of the UEs described herein). Referring to FIG. 6, the base station 602 may transmit a beamformed signal to the UE 604 on one or more transmit beams 602*a*, 602*b*, 602*c*, 602*d*, 602*e*, 602*f*, 602*g*, 602*h*, each having a beam identifier that can be used by the UE 604 to identify the respective beam. Where the base station 602 is beamforming towards the UE 604 with a single array of antennas (e.g., a single TRP/cell), the base station 602 may perform a "beam sweep" by transmitting first beam 602*a*, then beam 602*b*, and so on until lastly transmitting beam 602*h*. Alternatively, the base station 602 may transmit beams 602*a*-602*h* in some pattern, such as beam 602*a*, then beam 602*h*, then beam 602*b*, then beam 602*g*, and so on. Where the base station 602 is beamforming towards the UE 604 using multiple arrays of antennas (e.g., multiple TRPs/cells), each antenna array may perform a beam sweep of a subset of the beams 602*a*-602*h*. Alternatively, each of beams 602*a*-602*h* may correspond to a single antenna or antenna array.

FIG. 6 further illustrates the paths 612*c*, 612*d*, 612*e*, 612*f*, and 612*g* followed by the beamformed signal transmitted on beams 602*c*, 602*d*, 602*e*, 602*f*, and 602*g*, respectively. Each path 612*c*, 612*d*, 612*e*, 612*f*, 612*g* may correspond to a single "multipath" or, due to the propagation characteristics of radio frequency (RF) signals through the environment, may be comprised of a plurality (a cluster) of "multipaths." Note that although only the paths for beams 602*c*-602*g* are shown, this is for simplicity, and the signal transmitted on each of beams 602*a*-602*h* will follow some path. In the example shown, the paths 612*c*, 612*d*, 612*e*, and 612*f* are straight lines, while path 612*g* reflects off an obstacle 620 (e.g., a building, vehicle, terrain feature, etc.).

The UE 604 may receive the beamformed signal from the base station 602 on one or more receive beams 604*a*, 604*b*, 604*c*, 604*d*. Note that for simplicity, the beams illustrated in FIG. 6 represent either transmit beams or receive beams, depending on which of the base station 602 and the UE 604 is transmitting and which is receiving. Thus, the UE 604 may also transmit a beamformed signal to the base station 602 on one or more of the beams 604*a*-604*d*, and the base station 602 may receive the beamformed signal from the UE 604 on one or more of the beams 602*a*-602*h*.

In an aspect, the base station 602 and the UE 604 may perform beam training to align the transmit and receive beams of the base station 602 and the UE 604. For example, depending on environmental conditions and other factors, the base station 602 and the UE 604 may determine that the best transmit and receive beams are 602*d* and 604*b*, respectively, or beams 602*e* and 604*c*, respectively. The direction of the best transmit beam for the base station 602 may or may not be the same as the direction of the best receive beam, and likewise, the direction of the best receive beam for the UE 604 may or may not be the same as the direction of the best transmit beam. Note, however, that aligning the transmit and receive beams is not necessary to perform a downlink angle-of-departure (DL-AoD) or uplink angle-of-arrival (UL-AoA) positioning procedure.

To perform a DL-AoD positioning procedure, the base station 602 may transmit reference signals (e.g., PRS, CRS, TRS, CSI-RS, PSS, SSS, etc.) to the UE 604 on one or more of beams 602*a*-602*h*, with each beam having a different transmit angle. The different transmit angles of the beams will result in different received signal strengths (e.g., RSRP, RSRQ, SINR, etc.) at the UE 604. Specifically, the received signal strength will be lower for transmit beams 602*a*-602*h* that are further from the line of sight (LOS) path 610 between the base station 602 and the UE 604 than for transmit beams 602*a*-602*h* that are closer to the LOS path 610.

In the example of FIG. 6, if the base station 602 transmits reference signals to the UE 604 on beams 602*c*, 602*d*, 602*e*, 602*f*, and 602*g*, then transmit beam 602*e* is best aligned with the LOS path 610, while transmit beams 602*c*, 602*d*, 602*f*, and 602*g* are not. As such, beam 602*e* is likely to have a higher received signal strength at the UE 604 than beams 602*c*, 602*d*, 602*f*, and 602*g*. Note that the reference signals transmitted on some beams (e.g., beams 602*c* and/or 602*0* may not reach the UE 604, or energy reaching the UE 604 from these beams may be so low that the energy may not be detectable or at least can be ignored.

The UE 604 can report the received signal strength, and optionally, the associated measurement quality, of each measured transmit beam 602*c*-602*g* to the base station 602, or alternatively, the identity of the transmit beam having the highest received signal strength (beam 602*e* in the example of FIG. 6). Alternatively or additionally, if the UE 604 is also engaged in a round-trip-time (RTT) or time-difference of arrival (TDOA) positioning session with at least one base station 602 or a plurality of base stations 602, respectively, the UE 604 can report reception-to-transmission (Rx-Tx) time difference or reference signal time difference (RSTD) measurements (and optionally the associated measurement qualities), respectively, to the serving base station 602 or other positioning entity. In any case, the positioning entity (e.g., the base station 602, a location server, a third-party client, UE 604, etc.) can estimate the angle from the base station 602 to the UE 604 as the AoD of the transmit beam having the highest received signal strength at the UE 604, here, transmit beam 602e.

In one aspect of DL-AoD-based positioning, where there is only one involved base station 602, the base station 602 and the UE 604 can perform a round-trip-time (RTT) procedure to determine the distance between the base station 602 and the UE 604. Thus, the positioning entity can determine both the direction to the UE 604 (using DL-AoD positioning) and the distance to the UE 604 (using RTT positioning) to estimate the location of the UE 604. Note that the AoD of the transmit beam having the highest received signal strength does not necessarily lie along the LOS path 610, as shown in FIG. 6. However, for DL-AoD-based positioning purposes, it is assumed to do so.

In another aspect of DL-AoD-based positioning, where there are multiple involved base stations 602, each involved base station 602 can report, to the serving base station 602, the determined AoD from the respective base station 602 to the UE 604, or the RSRP measurements. The serving base station 602 may then report the AoDs or RSRP measurements from the other involved base station(s) 602 to the positioning entity (e.g., UE 604 for UE-based positioning or a location server for UE-assisted positioning). With this information, and knowledge of the base stations' 602 geographic locations, the positioning entity can estimate a location of the UE 604 as the intersection of the determined AoDs. There should be at least two involved base stations 602 for a two-dimensional (2D) location solution, but as will be appreciated, the more base stations 602 that are involved in the positioning procedure, the more accurate the estimated location of the UE 604 will be.

To perform an UL-AoA positioning procedure, the UE 604 transmits uplink reference signals (e.g., UL-PRS, SRS, DMRS, etc.) to the base station 602 on one or more of uplink transmit beams 604a-604d. The base station 602 receives the uplink reference signals on one or more of uplink receive beams 602a-602h. The base station 602 determines the angle of the best receive beams 602a-602h used to receive the one or more reference signals from the UE 604 as the AoA from the UE 604 to itself. Specifically, each of the receive beams 602a-602h will result in a different received signal strength (e.g., RSRP, RSRQ, SINR, etc.) of the one or more reference signals at the base station 602. Further, the channel impulse response of the one or more reference signals will be smaller for receive beams 602a-602h that are further from the actual LOS path between the base station 602 and the UE 604 than for receive beams 602a-602h that are closer to the LOS path. Likewise, the received signal strength will be lower for receive beams 602a-602h that are further from the LOS path than for receive beams 602a-602h that are closer to the LOS path. As such, the base station 602 identifies the receive beam 602a-602h that results in the highest received signal strength and, optionally, the strongest channel impulse response, and estimates the angle from itself to the UE 604 as the AoA of that receive beam 602a-602h. Note that as with DL-AoD-based positioning, the AoA of the receive beam 602a-602h resulting in the highest received signal strength (and strongest channel impulse response if measured) does not necessarily lie along the LOS path 610. However, for UL-AoA-based positioning purposes in FR2, it may be assumed to do so.

Note that while the UE 604 is illustrated as being capable of beamforming, this is not necessary for DL-AoD and UL-AoA positioning procedures. Rather, the UE 604 may receive and transmit on an omni-directional antenna.

Where the UE 604 is estimating its location (i.e., the UE is the positioning entity), it needs to obtain the geographic location of the base station 602. The UE 604 may obtain the location from, for example, the base station 602 itself or a location server (e.g., location server 230, LMF 270, SLP 272). With the knowledge of the distance to the base station 602 (based on the RTT or timing advance), the angle between the base station 602 and the UE 604 (based on the UL-AoA of the best receive beam 602a-602h), and the known geographic location of the base station 602, the UE 604 can estimate its location.

Alternatively, where a positioning entity, such as the base station 602 or a location server, is estimating the location of the UE 604, the base station 602 reports the AoA of the receive beam 602a-602h resulting in the highest received signal strength (and optionally strongest channel impulse response) of the reference signals received from the UE 604, or all received signal strengths and channel impulse responses for all receive beams 602a-602h (which allows the positioning entity to determine the best receive beam 602a-602h). The base station 602 may additionally report the Rx-Tx time difference to the UE 604. The positioning entity can then estimate the location of the UE 604 based on the UE's 604 distance to the base station 602, the AoA of the identified receive beam 602a-602h, and the known geographic location of the base station 602.

Currently, for DL-AoD-based positioning, the base station is expected to create narrow beams by using precoding (i.e., applying a set of phase values to respective antenna elements for beam steering a beam produced by the antenna) at the transmitter, and the UE is expected to measure the RSRP of each received/detected downlink beam. The UE then reports the beam identifier (e.g., beam index) of the first P beams with the RSRP ranked from highest to lowest. The precoding implemented at the base station for each beam is generally unknown to the UE. As such, the UE blindly reports the RSRP of each beam, and is unable to perform any angle estimation itself.

The present disclosure provides a mechanism to enable the UE to measure angle by restricting the beamforming at the base station. In an aspect, a base station may transmit multiple PRS resources, one from each antenna port. An "antenna port" is a logical concept related to the physical layer, and not a physical antenna panel. An antenna port is defined such that the channel over which a symbol on the antenna port is conveyed can be inferred from the channel over which another symbol on the same antenna port is conveyed. In other words, each individual downlink transmission is carried out from a specific antenna port, the identity of which is known to the UE, and the UE can assume that two transmitted signals have experienced the same radio channel if, and only if, they are transmitted from the same antenna port. In practice, each antenna port for downlink transmission can be assumed to correspond to a specific reference signal (e.g., PRS resource). Thus, each PRS resource transmitted by a base station corresponds to a specific antenna port.

In the disclosed mechanism, the main constraint is that the transmission from each antenna port should be identically beamformed. This allows the UE to observe the transmitted signal (e.g., PRS resource) as if transmitted from a uniform planar antenna array, with each "virtual antenna element of the array" having the same transmission pattern. Note that an option for no beamforming (i.e., transmission from each individual antenna element versus from a group of antenna elements, as with beamforming) is also valid and likely.

Figure 7:
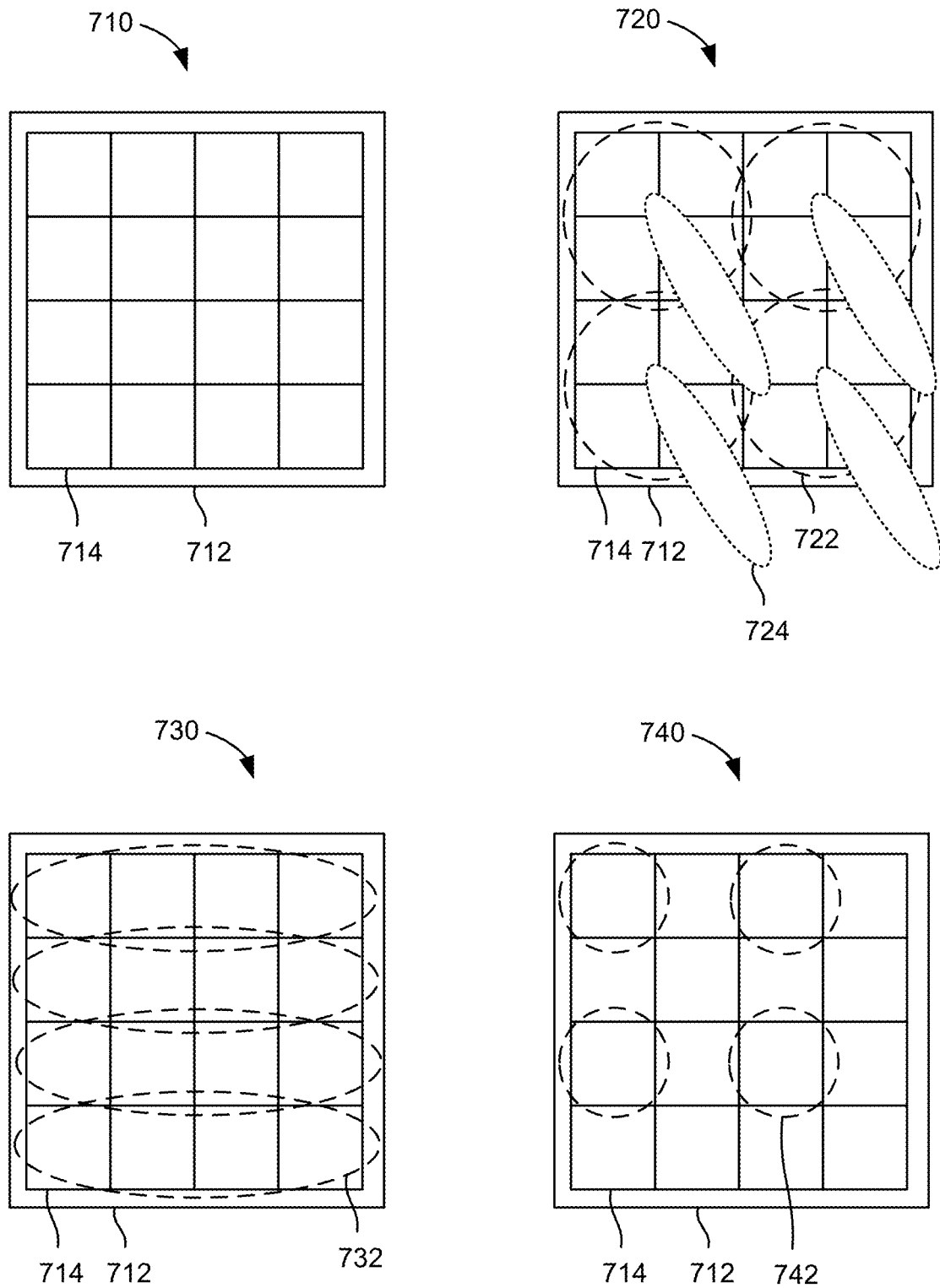
FIG. 7 illustrates various beamforming examples for different antenna port configurations, according to aspects of the disclosure.

FIG. 7 illustrates various beamforming examples for different antenna port configurations. In each example, an antenna panel 712 comprising a 4×4 array 16 antenna elements 714 is shown. The spacing of each antenna element 714 is λ/2 in both the horizontal and vertical axis of the antenna panel 712 (where "λ" (lambda) is the wavelength). The antenna panel 712 may correspond to a TRP or cell of a base station.

Diagram 710 illustrates an example with no beamforming. As such, the base station may transmit up to 16 PRS resources per polarization, one PRS resource per antenna element 714. In this example, each antenna element would correspond to an antenna port. The spacing of each antenna port (because each antenna port corresponds to an antenna element 714) is λ/2 in both the horizontal and vertical axis of the antenna panel 712. The example shown by diagram 710 is an example of an omni-directional antenna.

Diagram 720 illustrates an example where the 16 antenna elements 714 are divided into four antenna element groups 722 (denoted by dashed circles) of four contiguous antenna elements 714. Each antenna element group 722 corresponds to an antenna port and can be used to beamform a different PRS resource. Thus, dividing the antenna panel 712 into four antenna element groups 722 allows the base station to beamform up to four PRS resources per polarization. Because each antenna element group 722, corresponding to an antenna port, is two antenna elements 714 wide and two antenna elements 714 high, the spacing of each antenna port is λ (i.e., 2×λ/2) in both the horizontal and vertical axis.

Diagram 720 further illustrates the beams 724 that may be transmitted by the antenna element groups 722. Beams 724 may correspond to some of the beams 602a-h illustrated in FIG. 6. Conventionally, the base station may transmit PRS resources on each antenna element group 722 in independent (e.g., different) directions. However, as shown in diagram 720, each beam is identically beamformed, meaning each beam is transmitted in the same direction. As mentioned above, and as described further below, this allows the UE to observe the transmitted signal (e.g., PRS resource) as if transmitted from a uniform planar antenna array.

Diagram 730 illustrates an example where the 16 antenna elements 714 are again divided into four antenna element groups 732 (denoted by dashed ellipses) of four contiguous antenna elements 714. Each antenna element group 732 corresponds to an antenna port and can be used to beamform a different PRS resource. Thus, dividing the antenna panel 712 into four antenna element groups 732 allows the base station to beamform up to four PRS resources per polarization. Unlike the example of diagram 720, however, because each antenna element group 732, corresponding to an antenna port, is four antenna elements 714 wide and one antenna element 714 high, the spacing of each antenna port (i.e., each antenna element group 732) is 2λ (i.e., 4×λ/2) in the horizontal axis and λ/2 in the vertical axis.

Diagram 740 illustrates an example of beamforming using interleaved antenna elements 714. Specifically, diagram 740 illustrates an antenna element group 742 (denoted by four dashed circles) comprising four non-contiguous antenna elements 714 interleaved with the other antenna elements 714 of the antenna panel 712. The antenna element group 742 corresponds to an antenna port and may be used to transmit a specific PRS resource. Although only one antenna element group 742 is shown in diagram 740, the remaining antenna elements 714 may be divided into other antenna element group 742 of non-contiguous antenna elements 714. Each antenna element group, however, should identically beamform the respective PRS resource, meaning each beam will be transmitted in the same direction. Because each antenna element group (corresponding to an antenna port) in the example of diagram 740 will be adjacent to (interleaved with) other antenna element groups, the spacing of each antenna port is λ/2 in both the horizontal and vertical axis of the antenna panel 712.

As will be appreciated, the beamforming examples in FIG. 7 are not exhaustive, and there are many different patterns of antenna elements that could correspond to different antenna ports. In addition, the UE may receive the PRS resources from different antenna ports in either a time-division multiplexing (TDM), frequency-division multiplexing (FDM), or code-division multiplexing (CDM) manner, depending on how the resources are defined.

Because the hardware configuration of the antenna panel 712 does not change, but rather, the groupings of antenna elements 714 changes to form different antenna ports, the example antenna element groupings illustrated in FIG. 7 are referred to herein as "virtual antenna array configurations." A virtual antenna array configuration may specify the number of antenna ports (e.g., four in the examples of diagrams 720 and 730), the spacing between ports (e.g., λ in the example of diagram 720), and the like. In an aspect, the UE is signaled the virtual antenna array configuration (e.g., number of ports, spacing in each direction, etc.). The UE may receive this configuration from the location server (e.g., location server 230, LMF 270, SLP 272) in one or more LPP messages, or directly from the base station in RRC signaling.

The present disclosure provides both codebook-based and non-codebook-based angle measurement techniques. For the codebook-based technique, the set of potential angles that the UE can search over is provided by the definition of a codebook, similar to the Type I CSI precoding codebook.

More specifically, codebook-based precoding is a type of vector quantization of a channel experienced by a UE. The precoder codebook is a set of precoder matrices, each of which comprises a set of phase values that may be applied to respective antenna elements for beam steering of a beam produced by the antenna. Consequently, a precoder matrix may be called a steering matrix. The precoder codebook may be designed to take into account typical cellular propagation channels and antenna deployments. Codebooks are typically designed based on one-dimensional or two-dimensional discrete Fourier transform (1D/2D-DFT) vectors and thus implicitly assume that a uniform linear or uniform planar array (UPA) is used, for example, at a TRP.

As numerous two-dimensional antenna array dimensions may be used, codebooks are typically configurable and scalable. The antenna port (element) layout of an antenna panel in the vertical (number of rows) and horizontal (number of columns) dimensions (denoted $N_1$ and $N_2$, respectively) may be configured as part of a codebook configuration. For a multi-panel codebook, a number of panels, $N_g$, is also configured. If a dual-polarized antenna is used (which may be assumed), then a total number of ports of the codebook for the antenna is given by $P=2N_g N_1 N_2$, where P is the number of ports and $N_g=1$ for a single-panel case. Up to 32 ports are supported for NR codebooks at present, although the description herein is not limited to 32 ports. Presently, in NR, antenna port layouts that are supported comprise row and column combinations of: 1×2, 1×4 (e.g., as illustrated by the example of diagram 730), 1×6, 1×8, 1×12, 1×16, 2×2 (e.g., as illustrated by the example of diagram 720), 2×3, 2×4, 2×6, 2×8, 3×4, 4×4, although the description herein is not limited to these configurations. The N1, N2 configuration may be configured per multi-port PRS resource, or per PRS resource set, or per frequency layer, or associated with one or more TRPs (e.g., associated with one or more TRP IDs).

A codebook may be used that comprises a constant modulus DFT for a dual-polarized, two-dimensional UPA. The codebook comprises a combination of two linear precoder vectors. A DFT precoder where the precoder vector w used to precode a single-layer transmission using a single-polarized uniform linear array (ULA) with N antenna can be defined as:

$$w_{1D}(k) = \frac{1}{\sqrt{N}} \begin{bmatrix} e^{j2\pi \cdot 0 \cdot \frac{k}{QN}} \\ e^{j2\pi \cdot 1 \cdot \frac{k}{QN}} \\ \vdots \\ e^{j2\pi \cdot (N-1) \cdot \frac{k}{QN}} \end{bmatrix} \quad (1)$$

where k=0, 1, 2, . . . , Q(N−1) is a precoder index and Q is an oversampling factor that may be configured by a network entity (e.g., a base station or location server). For a two-dimensional UPA, a corresponding precoder matrix can be produced by taking the Kronecker product of two precoder vectors according to:

$$w_{2D}(k,l) = w_{1D}(k) \otimes w_{1D}(l) \quad (2)$$

where k is the precoder index in one dimensional and l is the precoder index in the other dimension (k=0, 1, 2, . . . , Q(N$_1$−1), l=0, 1, 2, . . . , Q(N$_2$−1)). This can be extended for a dual-polarized UPA according to:

$$w_{2D,DP}(k, l, \phi) = \begin{bmatrix} 1 \\ e^{j\phi} \end{bmatrix} \otimes w_{2D}(k, l) = \quad (3)$$

$$\begin{bmatrix} w_{2D}(k, l) \\ e^{j\phi} w_{2D}(k, l) \end{bmatrix} = \begin{bmatrix} w_{2D}(k, l) & 0 \\ 0 & w_{2D}(k, l) \end{bmatrix} \begin{bmatrix} 1 \\ e^{j\phi} \end{bmatrix}$$

where $e^{j\phi}$ is a co-phasing factor between the two dual polarizations (e.g., orthogonal polarizations). A fixed quantity of values of $\phi$ may be evaluated, e.g., selected from a QPSK alphabet where $$\phi \in \left\{ 0, \frac{\pi}{2}, \pi, \frac{3\pi}{2} \right\}.$$

The co-phasing factor is a phase difference between signals transmitted by the different polarizations of the antenna elements. A co-phasing factor between polarizations may vary over frequency while a beam direction corresponding to one of the precoder matrices, $w_{2D}(k, l)$, yielding a strongest beam (e.g., for codebook-based CSI feedback) or LOS beam will typically remain the same with different frequencies. The precoder matrix may be split into a matrix or beam factor indicative of the beam direction, which may be selected on a wideband level, and a phase factor comprising the polarization co-phasing, which may be selected on a sub-band level.

In the present disclosure, one or more codebooks can be defined and provided to a UE to enable the UE to determine the DL-AoD associated with a base station (or more specifically, a particular antenna panel/TRP/cell of the base station). More specifically, the one or more codebooks may provide a list of angle vectors (or matrices), similar to a CSI codebook, indicating the angles over which the UE should search for particular PRS resources from the base station. As described above with reference to FIG. 7, the PRS resources transmitted by an antenna panel should be identically beamformed to enable the UE to observe the different PRS resources as if transmitted from a uniform planar array. The UE searches for the transmitted PRS resources along the indicated angle vectors and determines the index of the vector that results in the strongest RSRP measurement. Because the PRS resources were identically beamformed, the corresponding wireless signals should all follow substantially the same path(s) to the UE, in contrast to the scenario where the PRS resources are not identically beamformed. Since the PRS resources are assumed to all follow the same path(s) to the UE, the angle from the codebook associated with strongest RSRP is most likely to be the DL-AoD from the base station (or more specifically, antenna panel).

In an aspect, the one or more codebooks may be hierarchical codebooks. Specifically, a first codebook can provide the angle information (e.g., vectors, matrices) for a coarse angle search, and a second codebook can provide the angle information for a fine angle search based on the first angle search. For example, vectors in the second codebook may be centered around the selected vector (angle) from the first codebook. Thus, as an example, the first codebook may provide angle vectors in increments of 10 degrees (e.g., 0 degrees, 10, degrees, 20 degrees, etc.) and the second codebook may provide angle vectors in increments of 1 degree from, for example, −5 degrees to +5 degrees. As such, once the UE identifies the 10-degree-increment angle resulting in the greatest RSRP, it can perform another search around that angle in the increments defined in the second codebook.

As will be appreciated, a benefit of hierarchical codebooks is a reduction in signaling overhead, as fewer and small values need to be transmitted, as well as a reduction in UE complexity, as a smaller set of angles need to be searched over. For example, instead of searching over 210 one-degree increments in the general direction of the base station, the UE can search over 21 ten-degree increments followed by 10 one-degree increments.

Figure 8:
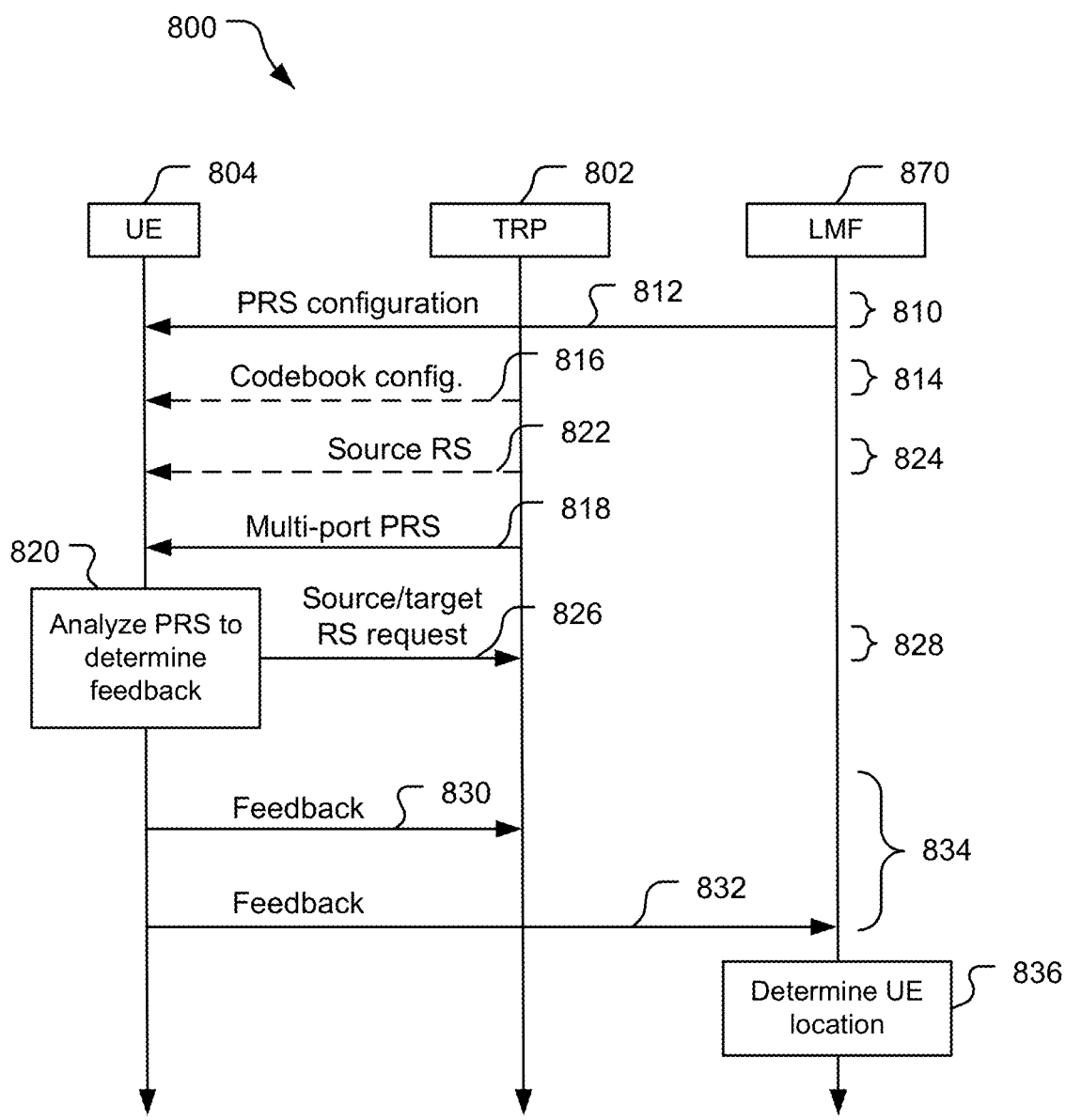
FIG. 8 illustrates an example flow for measuring multiport PRS resources and providing feedback, according to aspects of the disclosure.

FIG. 8 illustrates an example flow 800 for measuring multi-port PRS resources and providing feedback, according to aspects of the disclosure. At 810, a location server (e.g., illustrated as an LMF) provides a PRS configuration 812 to a UE 804 (e.g., any of the UEs described herein), via a TRP 802 (e.g., a TRP of any of the base stations described herein), and possibly to the TRP 802. The PRS configuration 812 provides scheduling information for the PRS transmitted by the TRP 802 (e.g., a PRS configuration as illustrated in FIG. 5), provides an indication to the UE 804 that the PRS will be a multi-port PRS, and provides codebook configuration values including the numbers of rows and columns N$_1$, N$_2$ of antenna elements that will be used to convey the multi-port PRS, the oversampling factor Q, the alphabet of $\phi$ values, and possibly which REs correspond to each polarization of signal emitted from the TRP 802. Also or alternatively, the TRP 802 may provide the codebook configuration values N$_1$, N$_2$, Q, $\phi$ in a codebook configuration message 816 at a stage 814.

At stage 818, the TRP 802 transmits the multi-port PRS with multiple PRS ports within a single slot using multiple OFDM symbols. For example, the TRP 802 may identically beamform the multi-port PRS using various transmission patterns, as shown in FIG. 7. The TRP 802 may transmit the PRS from different antenna ports in a TDM, FDM, or CDM manner. The UE 804 receives and measures the multi-port PRS transmitted by the TRP 802 at stage 818. The UE 804 measures a multi-port PRS (i.e., multiple PRS resources corresponding to multiple ports) in a single slot (and possibly in a single resource), although the UE 804 may measure the multi-port PRS resource multiple times (e.g., multiple repetitions of the multi-port PRS resource) to adequately measure the signal and obtain the desired information.

At stage 820, the UE 804 analyzes and processes the measured multi-port PRS to determine feedback information. The feedback information may be the angle from the TRP 802 to the UE 804. Referring to FIG. 6, applying the angle vectors (or matrices) to the measured channels will isolate energy from the multi-port PRS into effective beams, each effective beam corresponding to each individually-applied angle vector. By applying a codebook of precoder matrices in accordance with the codebook configuration values ($N_1$, $N_2$, Q, ϕ)), the UE 804 is able to analyze the multi-port PRS transmitted by the TRP 802 as though the TRP 802 sent the PRS in directional beams (e.g., beams 602a-h). The effective beams are logical reconstructions based on the received energy in the multi-port PRS and not necessarily beams as transmitted by the TRP 802 (i.e., the TRP 802 may not beamform the multi-port PRS). As the beams may not actually have been transmitted, but were logically simulated using the codebook, the associated angles may be considered effective angles (the angles that the beams would follow were the beams actually transmitted). Some beams (e.g., beams 602a, 602b, 602g, 602h) may not reach the UE 804, or energy reaching the UE 804 from these beams may be so low that the energy may not be detectable or at least can be ignored.

Applying the angle vectors (or matrices) to the received PRS to isolate the energy of effective beams yields an impulse response for each effective beam. The UE 804 analyzes the impulse responses of multiple effective beams of the multi-port PRS to determine which beam has the strongest RSRP and thus, likely followed the LOS path from the TRP 802 to the UE 804. The UE 804 may determine the DL-AoD of the effective beam determined to have the strongest RSRP. Specifically, the angle vector (or matrix) corresponding to the strongest effective beam provides an AoD relative to the TRP 802. The UE 804 may use a location and orientation of the TRP 802 in combination with the angle vector corresponding to the strongest effective beam to determine an AoD relative to a global coordinate system.

The UE 804 provides feedback determined during stage 820 to a network entity at stage 834. For example, the UE 804 may provide feedback to the TRP 802 in an RRC feedback message 830 and/or may provide feedback to the location server 870 in an LPP feedback message 832. The feedback message 830, 832 may include the beam index (k, l tuple) and the co-phasing factor for the strongest (e.g., strongest RSRP) effective beam and/or may include the AoD of the strongest effective beam.

At stage 836, the location server 870 can use the feedback information to determine a location of the UE 804. For example, the location server 870 can use, or determine, the AoD for an LOS beam to the UE 804 as part of a trilateration determination, e.g., using other AoDs for LOS beams from other TRPs 802, and the locations of the TRPs, to determine the location of the UE 804.

Referring now to the non-codebook-based technique, a UE can determine the angle (i.e., DL-AoD) directly using certain implementation-based angle search and/or optimization techniques. For UE-assisted mode, the angle is quantized (determined at some level of granularity) and then reported to the positioning entity (e.g., location server 230, LMF 270, SLP 272). The quantization granularity can be specified by the positioning entity, the applicable standard, UE capability, or the like. An advantage of a non-codebook-based method is full control over the algorithm at the UE side—there is no need for any configuration from the base station regarding the search codebook.

It should be noted that the UE may be permitted to report more than one angle or beam index. For example, if the UE measures two beams having substantially the same signal strength, it may report both, under the assumption that it is located between the beams.

It should also be noted that each port in the multi-port PRS resource set should have a common spatial QCL with the UE. That is, since each PRS resource is identically beamformed, they will have the same spatial relation with a receive beam at the UE, and the UE will be expected to receive the PRS resources on the same receive beam.

In an aspect, if the base station has multiple antenna panels, not all of which are oriented in the same plane, then different groups of multi-port PRS transmissions can be defined, at least one for each differently-oriented antenna panel. In this scenario, the UE cannot combine across the different groups without additional signaling (i.e., additional assistance data) from the base station. For example, the base station can signal to the UE the relative orientation of the panels to enable the UE to combine across panels.

In an aspect, the UE can select or recommend the granularity of the reported DL-AoD. For example, for tracking purposes, where the UE is moving (e.g., driving) the UE may report differential AoD measurements. That is, the UE may report a first AoD measurement in full and then subsequent AoD measurements as the difference between the original AoD measurement and the new AoD measurement. In addition, the base station may dynamically signal a codebook subset so that the UE can limit its search.

A similar mechanism is also applicable to the transmission of SRS. In this case, there can be groups of uplink multi-port SRS, with each group corresponding to an antenna panel of the UE. The UE can signal the distance and the relative orientation between the panels to the base station. The UE would then identically beamform SRS (or other uplink positioning signals) to the base station, the same as a base station would identically beam PRS to a UE, and the base station would measure the RSRP of each effective uplink beam, the same as a UE would measure the RSRP of each effective downlink beam, to determine the UL-AoA between the base station and the UE.

Another mechanism disclosed herein permits the use of different beamforming per antenna port. If the base station precodes the beam at each antenna port differently, then it is more difficult for the UE to determine the angles of the paths in the underlying channel corresponding to the antenna/PRS port. Currently, as described above for DL-AoD positioning, the UE observes a differently beamformed version of the channel from each port and selects the beam(s) with the best P RSRPs to report. The base station then uses the angle of the beam(s) to determine the DL-AoD. However, for at least UE-based positioning, it would be beneficial if the UE were able to determine (and optionally report) the angle between itself and the base station, rather than the base station determining and reporting the angle.

In various aspects, the UE can use the various beamformed versions of the channel (corresponding to different antenna ports) to reconstruct the underlying physical channel (or an approximation of it) between the base station and the UE. The UE can then determine the DL-AoD of the underlying channel and report it (and optionally the ToA of the associated beam) to the base station. An example of how to achieve this channel reconstruction for a different application (to enable multi-user transmissions) is described in the paper "Channel Reconstruction-Based Hybrid Precoding for Millimeter Wave Multi-User MIMO Systems" by Miguel R. Castellanos et al., which is incorporated by reference herein in its entirety.

To enable the UE to reconstruct the channel, the UE needs to be signaled the antenna configuration, antenna element pattern, and the beamforming pattern(s) used for each port (examples of which were illustrated in FIG. 7). The beamforming pattern(s) may be an index from a dictionary (e.g., a lookup table, codebook, etc.) to reduce signaling overhead. The UE can utilize this signaling and the beamformed channel from each antenna port to reconstruct the underlying channel, as described in the aforementioned white paper, and then perform the desired reporting. For example, the UE can report the angle, delay (e.g., ToA), RSRP, path energy ratio, probability of each path being LOS, co-phasing factor, and quality metrics for each of these parameters.

From a processing perspective, the foregoing mechanism (i.e., different beamforming per port) may be preferred on the network side as it reduces the constraints on the UE side. The base station can compute the relevant parameters based on signaling received from the location server (e.g., location server 230, LMF 270, SLP 272) and then forward the outcome to the location server.

There are additional considerations for the configurations and reports that are applicable to both mechanisms described above (i.e., using the same beamforming per port and using different beamforming per port). When the UE reports the DL-AoD, the definition of the measurement period may be different than where the UE simply reports the raw measurements. This is because the UE may need more time to perform such a measurement since the UE may need to do a codebook sweep or more advanced processing. The UE may indicate a capability on the number of multi-port PRS resources it can process in a time period and/or can support overall (e.g., per band or per band combination). This capability may also be in the form of the total number of ports the UE can process. Currently, the underlying assumption is that a single PRS resource maps to one antenna port (and therefore, the terms "PRS port" and "antenna port" can be used interchangeably). In addition, the measurement period may be different for a first measurement as opposed to a subsequent measurement, as there is a reduced search needed for subsequent measurements. The UE can also indicate its capability to jointly determine the angle and delay using the same PRS resource.

Regarding positioning accuracy requirements, the accuracy requirements for DL-AoD measurements may be determined assuming a single repetition of the PRS resource, since across repetitions, there may not be phase coherency. As such, if even a single symbol is punctured in a multi-port PRS, it may be defined that the DL-AoD measurement requirements do not need to be met.

Figure 9:
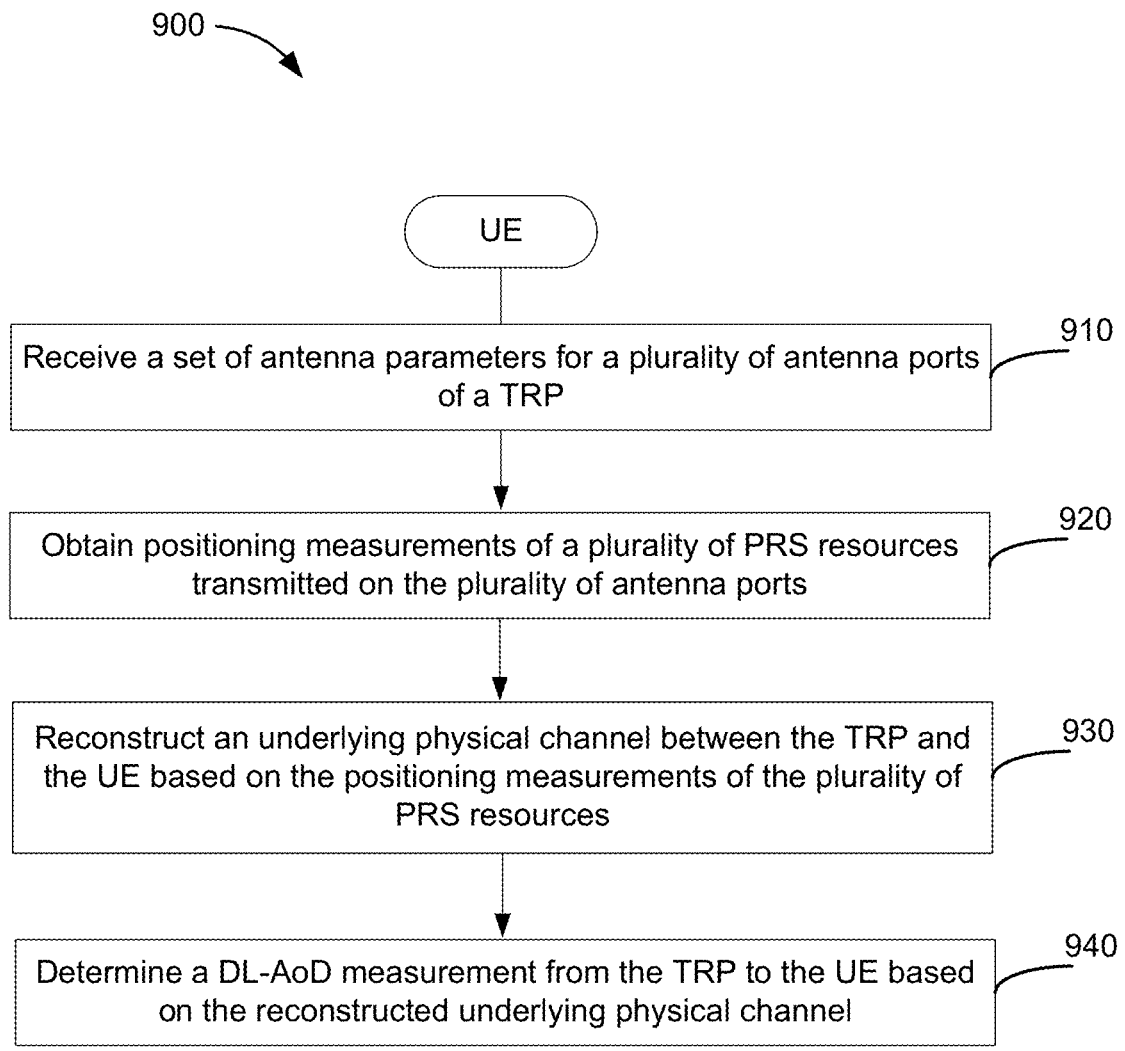
FIG. 9 illustrates an example method of wireless positioning, according to aspects of the disclosure.

FIG. 9 illustrates an example method 900 of wireless positioning, according to aspects of the disclosure. In an aspect, method 900 may be performed by a UE (e.g., any of the UEs described herein).

At 910, the UE receives a set of antenna parameters for a plurality of antenna ports of a TRP (e.g., a TRP of any of the base stations described herein). In an aspect, operation 910 may be performed by WWAN transceiver 310, processing system 332, memory component 340, and/or positioning component 342, any or all of which may be considered means for performing this operation.

At 920, the UE obtains positioning measurements of a plurality of PRS resources transmitted on the plurality of antenna ports. In an aspect, operation 920 may be performed by the one or more WWAN transceivers 310, the processor 332, memory 340, and/or positioning component 342, any or all of which may be considered means for performing this operation.

At 930, the UE reconstructs an underlying physical channel between the TRP and the UE based on the positioning measurements of the plurality of PRS resources. In an aspect, operation 930 may be performed by the one or more WWAN transceivers 310, the processor 332, memory 340, and/or positioning component 342, any or all of which may be considered means for performing this operation.

At 940, the UE determines a DL-AoD measurement from the TRP to the UE based on the reconstructed underlying physical channel. In an aspect, operation 940 may be performed by the one or more WWAN transceivers 310, the processor 332, memory 340, and/or positioning component 342, any or all of which may be considered means for performing this operation.

As will be appreciated, a technical advantage of the method 900 is that a UE is able to determine the DL-AoD between itself and a base station, rather than the network calculating the DL-AoD. This may be particularly beneficial for UE-based positioning techniques and to reduce signaling overhead between the UE and the base station.

In the detailed description above it can be seen that different features are grouped together in examples. This manner of disclosure should not be understood as an intention that the example clauses have more features than are explicitly mentioned in each clause. Rather, the various aspects of the disclosure may include fewer than all features of an individual example clause disclosed. Therefore, the following clauses should hereby be deemed to be incorporated in the description, wherein each clause by itself can stand as a separate example. Although each dependent clause can refer in the clauses to a specific combination with one of the other clauses, the aspect(s) of that dependent clause are not limited to the specific combination. It will be appreciated that other example clauses can also include a combination of the dependent clause aspect(s) with the subject matter of any other dependent clause or independent clause or a combination of any feature with other dependent and independent clauses. The various aspects disclosed herein expressly include these combinations, unless it is explicitly expressed or can be readily inferred that a specific combination is not intended (e.g., contradictory aspects, such as defining an element as both an insulator and a conductor). Furthermore, it is also intended that aspects of a clause can be included in any other independent clause, even if the clause is not directly dependent on the independent clause.

Implementation examples are described in the following numbered clauses:

Clause 1. A method of wireless positioning performed by a user equipment (UE), comprising: receiving a set of antenna parameters for a plurality of antenna ports of a transmission-reception point (TRP); obtaining positioning measurements of a plurality of positioning reference signal (PRS) resources transmitted on the plurality of antenna ports; reconstructing an underlying physical channel between the TRP and the UE based on the positioning measurements of the plurality of PRS resources; and determining a downlink angle of arrival (DL-AoD) measurement from the TRP to the UE based on the reconstructed underlying physical channel.

Clause 2. The method of clause 1, wherein the set of antenna parameters comprises an antenna configuration, an antenna element pattern, a beamforming pattern, or any combination thereof for each antenna port of the plurality of antenna ports.

Clause 3. The method of clause 2, wherein the antenna configuration, the antenna element pattern, the beamforming pattern, or any combination thereof are each received as an index value to a dictionary.

Clause 4. The method of any of clauses 1 to 3, wherein the positioning measurements comprise an angle measurement, a time of arrival (ToA) measurement, a reference signal received power (RSRP) measurement, a path energy ratio, a probability of each path being line of sight (LOS), a co-phasing factor, a quality metric for each positioning measurement, or any combination thereof.

Clause 5. The method of any of clauses 1 to 4, wherein the set of antenna parameters is received from the TRP, a serving base station, or a location server.

Clause 6. The method of any of clauses 1 to 5, further comprising: reporting the DL-AoD measurement to a positioning entity.

Clause 7. The method of clause 6, wherein the positioning entity comprises a serving base station or a location server.

Clause 8. The method of any of clauses 1 to 7, further comprising: transmitting a capability report, the capability report indicating capabilities of the UE to measure multi-port PRS resources.

Clause 9. The method of clause 8, wherein the capability report indicates a number of multi-port PRS resources the UE can process per measurement period or a total number of multi-port PRS resources the UE can process per band or per band combination.

Clause 10. The method of any of clauses 8 to 9, wherein a measurement period for processing the multi-port PRS resources to determine a first DL-AoD measurement of a positioning session is different than a measurement period for processing the multi-port PRS resources to determine a subsequent DL-AoD measurement of the positioning session.

Clause 11. The method of any of clauses 8 to 10, wherein the capability report indicates a total number of antenna ports the UE can process.

Clause 12. The method of any of clauses 8 to 11, wherein the capability report indicates a capability of the UE to jointly perform ToA and DL-AoD measurements using the same PRS resources of the plurality of PRS resources.

Clause 13. The method of any of clauses 1 to 12, wherein accuracy requirements for the DL-AoD measurement are based on a single repetition of each of the plurality of PRS resources.

Clause 14. The method of any of clauses 1 to 13, wherein, based on at least one symbol of one of the plurality of PRS resources being punctured, accuracy requirements for the DL-AoD measurement are not expected to be met.

Clause 15. A user equipment (UE), comprising: a memory; at least one transceiver; and at least one processor communicatively coupled to the memory and the at least one transceiver, the at least one processor configured to: receive, via the at least one transceiver, a set of antenna parameters for a plurality of antenna ports of a transmission-reception point (TRP); obtain positioning measurements of a plurality of positioning reference signal (PRS) resources transmitted on the plurality of antenna ports; reconstruct an underlying physical channel between the TRP and the UE based on the positioning measurements of the plurality of PRS resources; and determine a downlink angle of arrival (DL-AoD) measurement from the TRP to the UE based on the reconstructed underlying physical channel.

Clause 16. The UE of clause 15, wherein the set of antenna parameters comprises an antenna configuration, an antenna element pattern, a beamforming pattern, or any combination thereof for each antenna port of the plurality of antenna ports.

Clause 17. The UE of clause 16, wherein the antenna configuration, the antenna element pattern, the beamforming pattern, or any combination thereof are each received as an index value to a dictionary.

Clause 18. The UE of any of clauses 15 to 17, wherein the positioning measurements comprise an angle measurement, a time of arrival (ToA) measurement, a reference signal received power (RSRP) measurement, a path energy ratio, a probability of each path being line of sight (LOS), a co-phasing factor, a quality metric for each positioning measurement, or any combination thereof.

Clause 19. The UE of any of clauses 15 to 18, wherein the set of antenna parameters is received from the TRP, a serving base station, or a location server.

Clause 20. The UE of any of clauses 15 to 19, wherein the at least one processor is further configured to: report, via the at least one transceiver, the DL-AoD measurement to a positioning entity.

Clause 21. The UE of clause 20, wherein the positioning entity comprises a serving base station or a location server.

Clause 22. The UE of any of clauses 15 to 21, wherein the at least one processor is further configured to: transmit, via the at least one transceiver, a capability report, the capability report indicating capabilities of the UE to measure multi-port PRS resources.

Clause 23. The UE of clause 22, wherein the capability report indicates a number of multi-port PRS resources the UE can process per measurement period or a total number of multi-port PRS resources the UE can process per band or per band combination.

Clause 24. The UE of any of clauses 22 to 23, wherein a measurement period for processing the multi-port PRS resources to determine a first DL-AoD measurement of a positioning session is different than a measurement period for processing the multi-port PRS resources to determine a subsequent DL-AoD measurement of the positioning session.

Clause 25. The UE of any of clauses 22 to 24, wherein the capability report indicates a total number of antenna ports the UE can process.

Clause 26. The UE of any of clauses 22 to 25, wherein the capability report indicates a capability of the UE to jointly perform ToA and DL-AoD measurements using the same PRS resources of the plurality of PRS resources.

Clause 27. The UE of any of clauses 15 to 26, wherein accuracy requirements for the DL-AoD measurement are based on a single repetition of each of the plurality of PRS resources.

Clause 28. The UE of any of clauses 15 to 27, wherein, based on at least one symbol of one of the plurality of PRS resources being punctured, accuracy requirements for the DL-AoD measurement are not expected to be met.

Clause 29. A user equipment (UE), comprising: means for receiving a set of antenna parameters for a plurality of antenna ports of a transmission-reception point (TRP); means for obtaining positioning measurements of a plurality of positioning reference signal (PRS) resources transmitted on the plurality of antenna ports; means for reconstructing an underlying physical channel between the TRP and the UE based on the positioning measurements of the plurality of PRS resources; and means for determining a downlink angle of arrival (DL-AoD) measurement from the TRP to the UE based on the reconstructed underlying physical channel.

Clause 30. The UE of clause 29, wherein the set of antenna parameters comprises an antenna configuration, an antenna element pattern, a beamforming pattern, or any combination thereof for each antenna port of the plurality of antenna ports.

Clause 31. The UE of clause 30, wherein the antenna configuration, the antenna element pattern, the beamforming pattern, or any combination thereof are each received as an index value to a dictionary.

Clause 32. The UE of any of clauses 29 to 31, wherein the positioning measurements comprise an angle measurement, a time of arrival (ToA) measurement, a reference signal received power (RSRP) measurement, a path energy ratio, a probability of each path being line of sight (LOS), a co-phasing factor, a quality metric for each positioning measurement, or any combination thereof.

Clause 33. The UE of any of clauses 29 to 32, wherein the set of antenna parameters is received from the TRP, a serving base station, or a location server.

Clause 34. The UE of any of clauses 29 to 33, further comprising: means for reporting the DL-AoD measurement to a positioning entity.

Clause 35. The UE of clause 34, wherein the positioning entity comprises a serving base station or a location server.

Clause 36. The UE of any of clauses 29 to 35, further comprising: means for transmitting a capability report, the capability report indicating capabilities of the UE to measure multi-port PRS resources.

Clause 37. The UE of clause 36, wherein the capability report indicates a number of multi-port PRS resources the UE can process per measurement period or a total number of multi-port PRS resources the UE can process per band or per band combination.

Clause 38. The UE of any of clauses 36 to 37, wherein a measurement period for processing the multi-port PRS resources to determine a first DL-AoD measurement of a positioning session is different than a measurement period for processing the multi-port PRS resources to determine a subsequent DL-AoD measurement of the positioning session.

Clause 39. The UE of any of clauses 36 to 38, wherein the capability report indicates a total number of antenna ports the UE can process.

Clause 40. The UE of any of clauses 36 to 39, wherein the capability report indicates a capability of the UE to jointly perform ToA and DL-AoD measurements using the same PRS resources of the plurality of PRS resources.

Clause 41. The UE of any of clauses 29 to 40, wherein accuracy requirements for the DL-AoD measurement are based on a single repetition of each of the plurality of PRS resources.

Clause 42. The UE of any of clauses 29 to 41, wherein, based on at least one symbol of one of the plurality of PRS resources being punctured, accuracy requirements for the DL-AoD measurement are not expected to be met.

Clause 43. A non-transitory computer-readable medium storing computer-executable instructions that, when executed by a user equipment (UE), cause the UE to: receive a set of antenna parameters for a plurality of antenna ports of a transmission-reception point (TRP); obtain positioning measurements of a plurality of positioning reference signal (PRS) resources transmitted on the plurality of antenna ports; reconstruct an underlying physical channel between the TRP and the UE based on the positioning measurements of the plurality of PRS resources; and determine a downlink angle of arrival (DL-AoD) measurement from the TRP to the UE based on the reconstructed underlying physical channel.

Clause 44. The non-transitory computer-readable medium of clause 43, wherein the set of antenna parameters comprises an antenna configuration, an antenna element pattern, a beamforming pattern, or any combination thereof for each antenna port of the plurality of antenna ports.

Clause 45. The non-transitory computer-readable medium of clause 44, wherein the antenna configuration, the antenna element pattern, the beamforming pattern, or any combination thereof are each received as an index value to a dictionary.

Clause 46. The non-transitory computer-readable medium of any of clauses 43 to 45, wherein the positioning measurements comprise an angle measurement, a time of arrival (ToA) measurement, a reference signal received power (RSRP) measurement, a path energy ratio, a probability of each path being line of sight (LOS), a co-phasing factor, a quality metric for each positioning measurement, or any combination thereof.

Clause 47. The non-transitory computer-readable medium of any of clauses 43 to 46, wherein the set of antenna parameters is received from the TRP, a serving base station, or a location server.

Clause 48. The non-transitory computer-readable medium of any of clauses 43 to 47, further comprising computer-executable instructions that, when executed by the UE, cause the UE to: report the DL-AoD measurement to a positioning entity.

Clause 49. The non-transitory computer-readable medium of clause 48, wherein the positioning entity comprises a serving base station or a location server.

Clause 50. The non-transitory computer-readable medium of any of clauses 43 to 49, further comprising computer-executable instructions that, when executed by the UE, cause the UE to: transmit a capability report, the capability report indicating capabilities of the UE to measure multi-port PRS resources.

Clause 51. The non-transitory computer-readable medium of clause 50, wherein the capability report indicates a number of multi-port PRS resources the UE can process per measurement period or a total number of multi-port PRS resources the UE can process per band or per band combination.

Clause 52. The non-transitory computer-readable medium of any of clauses 50 to 51, wherein a measurement period for processing the multi-port PRS resources to determine a first DL-AoD measurement of a positioning session is different than a measurement period for processing the multi-port PRS resources to determine a subsequent DL-AoD measurement of the positioning session.

Clause 53. The non-transitory computer-readable medium of any of clauses 50 to 52, wherein the capability report indicates a total number of antenna ports the UE can process.

Clause 54. The non-transitory computer-readable medium of any of clauses 50 to 53, wherein the capability report indicates a capability of the UE to jointly perform ToA and DL-AoD measurements using the same PRS resources of the plurality of PRS resources.

Clause 55. The non-transitory computer-readable medium of any of clauses 43 to 54, wherein accuracy requirements for the DL-AoD measurement are based on a single repetition of each of the plurality of PRS resources.

Clause 56. The non-transitory computer-readable medium of any of clauses 43 to 55, wherein, based on at least one symbol of one of the plurality of PRS resources being punctured, accuracy requirements for the DL-AoD measurement are not expected to be met.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a general purpose processor, a digital signal processor (DSP), an ASIC, a field-programable gate array (FPGA), or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, for example, a combination of a DSP and a microprocessor, a plurality of microprocessors, one or more microprocessors in conjunction with a DSP core, or any other such configuration.

The methods, sequences and/or algorithms described in connection with the aspects disclosed herein may be embodied directly in hardware, in a software module executed by a processor, or in a combination of the two. A software module may reside in random access memory (RAM), flash memory, read-only memory (ROM), erasable programmable ROM (EPROM), electrically erasable programmable ROM (EEPROM), registers, hard disk, a removable disk, a CD-ROM, or any other form of storage medium known in the art. An example storage medium is coupled to the processor such that the processor can read information from, and write information to, the storage medium. In the alternative, the storage medium may be integral to the processor. The processor and the storage medium may reside in an ASIC. The ASIC may reside in a user terminal (e.g., UE). In the alternative, the processor and the storage medium may reside as discrete components in a user terminal.

In one or more example aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

While the foregoing disclosure shows illustrative aspects of the disclosure, it should be noted that various changes and modifications could be made herein without departing from the scope of the disclosure as defined by the appended claims. The functions, steps and/or actions of the method claims in accordance with the aspects of the disclosure described herein need not be performed in any particular order. Furthermore, although elements of the disclosure may be described or claimed in the singular, the plural is contemplated unless limitation to the singular is explicitly stated.

What is claimed is:

1. A method of wireless positioning performed by a user equipment (UE), comprising:
    receiving a set of antenna parameters for a plurality of antenna ports of a transmission-reception point (TRP);
    obtaining positioning measurements of a plurality of positioning reference signal (PRS) resources transmitted on the plurality of antenna ports;
    reconstructing an underlying physical channel between the TRP and the UE based on the positioning measurements of the plurality of PRS resources; and
    determining a downlink angle of arrival (DL-AoD) measurement from the TRP to the UE based on the reconstructed underlying physical channel.

2. The method of claim 1, wherein the set of antenna parameters comprises an antenna configuration, an antenna element pattern, a beamforming pattern, or any combination thereof for each antenna port of the plurality of antenna ports.

3. The method of claim 2, wherein the antenna configuration, the antenna element pattern, the beamforming pattern, or any combination thereof are each received as an index value to a dictionary.

4. The method of claim 1, wherein the positioning measurements comprise an angle measurement, a time of arrival (ToA) measurement, a reference signal received power (RSRP) measurement, a path energy ratio, a probability of each path being line of sight (LOS), a co-phasing factor, a quality metric for each positioning measurement, or any combination thereof.

5. The method of claim 1, wherein the set of antenna parameters is received from the TRP, a serving base station, or a location server.

6. The method of claim 1, further comprising:
reporting the DL-AoD measurement to a positioning entity.

7. The method of claim 6, wherein the positioning entity comprises a serving base station or a location server.

8. The method of claim 1, further comprising:
transmitting a capability report, the capability report indicating capabilities of the UE to measure multi-port PRS resources.

9. The method of claim 8, wherein the capability report indicates a number of multi-port PRS resources the UE can process per measurement period or a total number of multi-port PRS resources the UE can process per band or per band combination.

10. The method of claim 8, wherein a measurement period for processing the multi-port PRS resources to determine a first DL-AoD measurement of a positioning session is different than a measurement period for processing the multi-port PRS resources to determine a subsequent DL-AoD measurement of the positioning session.

11. The method of claim 8, wherein the capability report indicates a total number of antenna ports the UE can process.

12. The method of claim 8, wherein the capability report indicates a capability of the UE to jointly perform ToA and DL-AoD measurements using the same PRS resources of the plurality of PRS resources.

13. The method of claim 1, wherein accuracy requirements for the DL-AoD measurement are based on a single repetition of each of the plurality of PRS resources.

14. The method of claim 1, wherein, based on at least one symbol of one of the plurality of PRS resources being punctured, accuracy requirements for the DL-AoD measurement are not expected to be met.

15. A user equipment (UE), comprising:
a memory;
at least one transceiver; and
at least one processor communicatively coupled to the memory and the at least one transceiver, the at least one processor configured to:
receive, via the at least one transceiver, a set of antenna parameters for a plurality of antenna ports of a transmission-reception point (TRP);
obtain positioning measurements of a plurality of positioning reference signal (PRS) resources transmitted on the plurality of antenna ports;
reconstruct an underlying physical channel between the TRP and the UE based on the positioning measurements of the plurality of PRS resources; and
determine a downlink angle of arrival (DL-AoD) measurement from the TRP to the UE based on the reconstructed underlying physical channel.

16. The UE of claim 15, wherein the set of antenna parameters comprises an antenna configuration, an antenna element pattern, a beamforming pattern, or any combination thereof for each antenna port of the plurality of antenna ports.

17. The UE of claim 16, wherein the antenna configuration, the antenna element pattern, the beamforming pattern, or any combination thereof are each received as an index value to a dictionary.

18. The UE of claim 15, wherein the positioning measurements comprise an angle measurement, a time of arrival (ToA) measurement, a reference signal received power (RSRP) measurement, a path energy ratio, a probability of each path being line of sight (LOS), a co-phasing factor, a quality metric for each positioning measurement, or any combination thereof.

19. The UE of claim 15, wherein the set of antenna parameters is received from the TRP, a serving base station, or a location server.

20. The UE of claim 15, wherein the at least one processor is further configured to:
report, via the at least one transceiver, the DL-AoD measurement to a positioning entity.

21. The UE of claim 20, wherein the positioning entity comprises a serving base station or a location server.

22. The UE of claim 15, wherein the at least one processor is further configured to:
transmit, via the at least one transceiver, a capability report, the capability report indicating capabilities of the UE to measure multi-port PRS resources.

23. The UE of claim 22, wherein the capability report indicates a number of multi-port PRS resources the UE can process per measurement period or a total number of multi-port PRS resources the UE can process per band or per band combination.

24. The UE of claim 22, wherein a measurement period for processing the multi-port PRS resources to determine a first DL-AoD measurement of a positioning session is different than a measurement period for processing the multi-port PRS resources to determine a subsequent DL-AoD measurement of the positioning session.

25. The UE of claim 22, wherein the capability report indicates a total number of antenna ports the UE can process.

26. The UE of claim 22, wherein the capability report indicates a capability of the UE to jointly perform ToA and DL-AoD measurements using the same PRS resources of the plurality of PRS resources.

27. The UE of claim 15, wherein accuracy requirements for the DL-AoD measurement are based on a single repetition of each of the plurality of PRS resources.

28. The UE of claim 15, wherein, based on at least one symbol of one of the plurality of PRS resources being punctured, accuracy requirements for the DL-AoD measurement are not expected to be met.

29. A user equipment (UE), comprising:
means for receiving a set of antenna parameters for a plurality of antenna ports of a transmission-reception point (TRP);
means for obtaining positioning measurements of a plurality of positioning reference signal (PRS) resources transmitted on the plurality of antenna ports;
means for reconstructing an underlying physical channel between the TRP and the UE based on the positioning measurements of the plurality of PRS resources; and
means for determining a downlink angle of arrival (DL-AoD) measurement from the TRP to the UE based on the reconstructed underlying physical channel.

30. A non-transitory computer-readable medium storing computer-executable instructions that, when executed by a user equipment (UE), cause the UE to:
receive a set of antenna parameters for a plurality of antenna ports of a transmission-reception point (TRP);
obtain positioning measurements of a plurality of positioning reference signal (PRS) resources transmitted on the plurality of antenna ports;
reconstruct an underlying physical channel between the TRP and the UE based on the positioning measurements of the plurality of PRS resources; and determine a downlink angle of arrival (DL-AoD) measurement from the TRP to the UE based on the reconstructed underlying physical channel.

\* \* \* \* \*